(12) United States Patent
Karapetyan et al.

(10) Patent No.: US 12,429,888 B2
(45) Date of Patent: *Sep. 30, 2025

(54) ROBOT LOCALIZATION AND MAPPING ACCOMMODATING NON-UNIQUE LANDMARKS

(71) Applicant: iRobot Corporation, Bedford, MA (US)

(72) Inventors: Vazgen Karapetyan, Northridge, CA (US); Artem Gritsenko, Malden, MA (US); Zacharias Psarakis, Melrose, MA (US); Guanlai Li, Westford, MA (US); Daniele Tamino, Monrovia, CA (US)

(73) Assignee: iRobot Corporation, Bedford, MA (US)

( * ) Notice: Subject to any disclaimer, the term of this patent is extended or adjusted under 35 U.S.C. 154(b) by 237 days.

This patent is subject to a terminal disclaimer.

(21) Appl. No.: 18/202,413

(22) Filed: May 26, 2023

(65) Prior Publication Data

US 2023/0384795 A1 Nov. 30, 2023

Related U.S. Application Data

(63) Continuation of application No. 17/021,507, filed on Sep. 15, 2020, now Pat. No. 11,662,743.

(51) Int. Cl.
*G05D 1/241* (2024.01)
*G05D 1/244* (2024.01)
(Continued)

(52) U.S. Cl.
CPC ............. *G05D 1/241* (2024.01); *G05D 1/244* (2024.01); *G05D 1/2462* (2024.01); *G05D 1/661* (2024.01); *G05D 1/86* (2024.01)

(58) Field of Classification Search
CPC .. G05D 1/0242; G05D 1/0219; G05D 1/0221; G05D 1/0225; G05D 1/0227;
(Continued)

(56) References Cited

U.S. PATENT DOCUMENTS 7,196,487 B2 3/2007 Jones et al.
7,404,000 B2 7/2008 Lolayekar et al.
(Continued)

FOREIGN PATENT DOCUMENTS

WO 2022060530 3/2022

OTHER PUBLICATIONS

Kirmse, et al., "Global Localization of an Indoor Mobile Robot With a Single Base Station", 2006, IFAC Proceedings Volumes, vol. 39, Issue 16, pp. 578-583 (Year: 2006).*

(Continued)

*Primary Examiner* — Spencer D Patton
(74) *Attorney, Agent, or Firm* — Schwegman Lundberg & Woessner, P.A.

(57) ABSTRACT

Robot localization or mapping can be provided without requiring the expense or complexity an "at-a-distance" sensor, such as a camera, a LIDAR sensor, or the like. Adjacency-derived landmark features can be used and non-unique landmark features can be accommodated. Uncertainty in robot pose can be tracked and compared to an adaptive threshold, and non-dock and dock-based localization behavior can be controlled based on the uncertainty, the adaptive threshold, one or more other thresholds, and the accessibility of available differently oriented landmark features, such as perpendicularly oriented straight wall segments landmark features. Available features can be sorted according to a quality metric, and path planning and navigation techniques are also included for helping obtain successful wall-following and localization observations.

20 Claims, 13 Drawing Sheets

(51) Int. Cl.
*G05D 1/246* (2024.01)
*G05D 1/661* (2024.01)
*G05D 1/86* (2024.01)

(58) Field of Classification Search
CPC .. G05D 1/0229; G05D 1/0231; G05D 1/0238; G05D 1/0244; G05D 1/0255–0274; G05D 1/2287; G05D 1/24–247; G05D 1/661; G05D 1/86; G05D 2201/0203; G05D 2201/0206; G05D 2201/0207; G05D 2201/0211; G05D 2201/0215; G05D 2201/0216; Y10S 901/01
See application file for complete search history.

(56) References Cited

U.S. PATENT DOCUMENTS

| | | | |
|---|---|---|---|
| 9,630,319 | B2 | 4/2017 | Vicenti |
| 11,274,929 | B1 | 3/2022 | Afrouzi et al. |
| 11,662,743 | B2 * | 5/2023 | Karapetyan ............ G05D 1/027 700/245 |
| 2005/0046373 | A1 | 3/2005 | Aldred |
| 2005/0156562 | A1 | 7/2005 | Cohen et al. |
| 2014/0100693 | A1 | 4/2014 | Fong et al. |
| 2014/0207282 | A1 | 7/2014 | Angle et al. |
| 2016/0271795 | A1 * | 9/2016 | Vicenti ................. G05D 1/644 |
| 2022/0080592 | A1 | 3/2022 | Karapetyan et al. |

OTHER PUBLICATIONS

"International Application Serial No. PCT US2021 046909, International Search Report mailed Dec. 2, 2021", 4 pgs.
"International Application Serial No. PCT US2021 046909, Written Opinion mailed Dec. 2, 2021", 9 pgs.
"U.S. Appl. No. 17/021,507, Non Final Office Action mailed Aug. 22, 2022", 15 pgs.
"U.S. Appl. No. 17/021,507, Examiner Interview Summary mailed Nov. 21, 2022", 2 pgs.
"U.S. Appl. No. 17/021,507, Response filed Nov. 22, 2022 to Non Final Office Action mailed Aug. 22, 2022", 12 pgs.
"U.S. Appl. No. 17/021,507, Final Office Action mailed Dec. 22, 2022", 17 pgs.
"Weighted Criteria Matrix", [Online] Retrieved from the internet:https: goleansixsigma.com weighted-criteria-matrix , (Dec. 6, 2019).
"U.S. Appl. No. 17/021,507, Response filed Feb. 10, 2023 to Final Office Action mailed Dec. 22, 2022", 11 pgs.
"U.S. Appl. No. 17/021,507, Advisory Action mailed Feb. 17, 2023", 3 pgs.
"International Application Serial No. PCT US2021 046909, International Preliminary Report on Patentability mailed Mar. 30, 2023", 11 pgs.
"U.S. Appl. No. 17/021,507, Notice of Allowance mailed Apr. 5, 2023", 5 pgs.
"U.S. Appl. No. 17/021,507, Supplemental Notice of Allowability mailed May 4, 2023", 2 pgs.
U.S. Appl. No. 17/021,507 U.S. Pat. No. 11,662,743, filed Sep. 15, 2020, Robot Localization and Mapping Accommodating Non-Unique Landmarks.

* cited by examiner

ROBOT LOCALIZATION AND MAPPING ACCOMMODATING NON-UNIQUE LANDMARKS

PRIORITY APPLICATIONS

This application is a continuation of U.S. patent application Ser. No. 17/021,507, filed Sep. 15, 2020, the content of which is incorporated herein by reference in its entirety.

TECHNICAL FIELD

This document relates generally to mobile robots and, more particularly, to systems, devices, and methods for robot localization and mapping.

BACKGROUND

Autonomous mobile robots can move about an environment. The robot can perform several functions and operations in a variety of categories. Such functions can include, for example, security operations, infrastructure or maintenance operations, navigation or mapping operations, inventory management operations, and robot/human interaction operations. Mobile cleaning robots can autonomously perform cleaning tasks, such as within a home or other environment. Such cleaning robots can be autonomous to some degree and in different ways. For example, a cleaning robot can conduct cleaning missions, during which the robot traverses and concurrently ingests (e.g., vacuums) debris from the floor surface of the environment.

Some mobile robots are capable of storing a map of the robot environment. The map can be useful to determine robot localization information, such as can include one or more aspects of the robot's "pose", such as its location, its orientation, or both, within the mapped environment. The mobile robot can use the map, the localization information, or both, such as to help fulfill one or more of its goals, such as can include path planning or navigating the mobile robot about the environment such as to perform a cleaning or other mission.

Some mobile robots include an onboard camera, such as to collect a steady stream of monocular or binocular visual images of the surrounding environment from which a mobile robot's location or pose can be determined. Such visual images can include visual landmarks that can be recognized by image-processing circuitry onboard the mobile robot such as for use in such a determination. Such image processing and image recognition of such "at-a-distance" visual landmarks can be computationally expensive. Similarly, some mobile robots can use light detection and ranging (LIDAR) or other "at-a-distance" sensing for recognizing non-visual "at-a-distance" landmarks. Computationally expensive LIDAR signal processing can be needed for processing and recognition of such "at-a-distance" LIDAR landmarks. The cost of adding a camera or LIDAR or other "at-a-distance" sensors can increase the cost of the mobile robot.

SUMMARY/OVERVIEW

The present inventors have recognized, among other things, an unmet need to provide robot localization or mapping without requiring the expense and complexity of an "at-a-distance" sensor, such as a camera, a LIDAR sensor, or the like.

This can involve using an "adjacency sensor" instead of requiring an "at-a-distance" sensor. An illustrative example of such an adjacency sensor can include a bump force sensor indicating when a mobile cleaning robot bumps against and thereby contacts an object or obstacle in the environment. Another illustrative example of such an adjacency sensor can include a "wall-following" sensor such as can include a short-range infra-red (IR) or other optical sensor, Such a short-range adjacency sensor can be configured to indicate that the mobile cleaning robot is about to bump up against an adjacent object or obstacle, for example, when the adjacent object or obstacle becomes close enough to the mobile cleaning robot—without requiring that the mobile cleaning robot actually bump up against and contact the adjacent object or obstacle in the environment. Such adjacency sensors can be less expensive and can involve less complex signal processing by the mobile cleaning robot—and may already be needed by the mobile robot for other purposes.

The adjacency sensor approach can present a technical challenge for robot localization without requiring a camera or other "at a distance" sensor onboard the robot. The adjacency sensor may be used to create or detect landmark features, but such adjacency-derived landmark features may present more ambiguity than landmark features obtained using a steady stream of visual images from a camera onboard the robot. The adjacency derived landmark features may be non-unique or difficult to distinguish from each other, such as, for example, in the case of straight-wall segment landmark features created or detected using a wall-following behavior of the robot. Such straight wall segments in a household environment may be joined at an angle, such as a perpendicular or other "corner." But such straight wall segments created or detected by wall following may not be contiguous, and may be oriented in the same direction as each other (aligned with each other), rather than being oriented perpendicularly or at another well-defined angle. Such aligned straight wall segments may also be the same or similar in length (this is permitted, but not required), such that two or more resulting landmark features in a set of landmark features defined using such straight wall segments may be non-unique. It can be desirable to permit re-localization of the robot using such non-unique landmarks, or based on a combination of unique and non-unique landmarks. It can also be desirable to permit re-localization of a robot during a mission based on potentially unique landmarks created and defined during that mission, without having to rely on landmarks created and defined during a previous mapping mission and stored in a map. The present techniques for robot localization and mapping can help address one or more of these technical challenges, such as in a robot that need not include an "at-a-distance" sensor.

This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

This document describes techniques for robot localization and mapping of environment that need not rely on an "at-a-distance" sensor. The present techniques can involve using an "adjacency sensor" and using adjacency-derived landmark features, instead of requiring a steady-stream of visual images from a camera or other "at a distance" sensor. While this can be a cheaper and efficient approach, it presents a technical challenge of how to perform such localization and mapping without requiring the use of range or distance information that an "at-a-distance" sensor can provide.

This document describes ways to use adjacency sensor and robot motion information to perform robot localization and mapping. In particular, this document also describes particular techniques that can permit using non-unique landmarks encountered during a mission, such as straight wall segments of similar lengths and orientation, for robot re-localization during that mission or subsequent missions.

Autonomous Mobile Cleaning Robot Platform Examples

Figure 1:
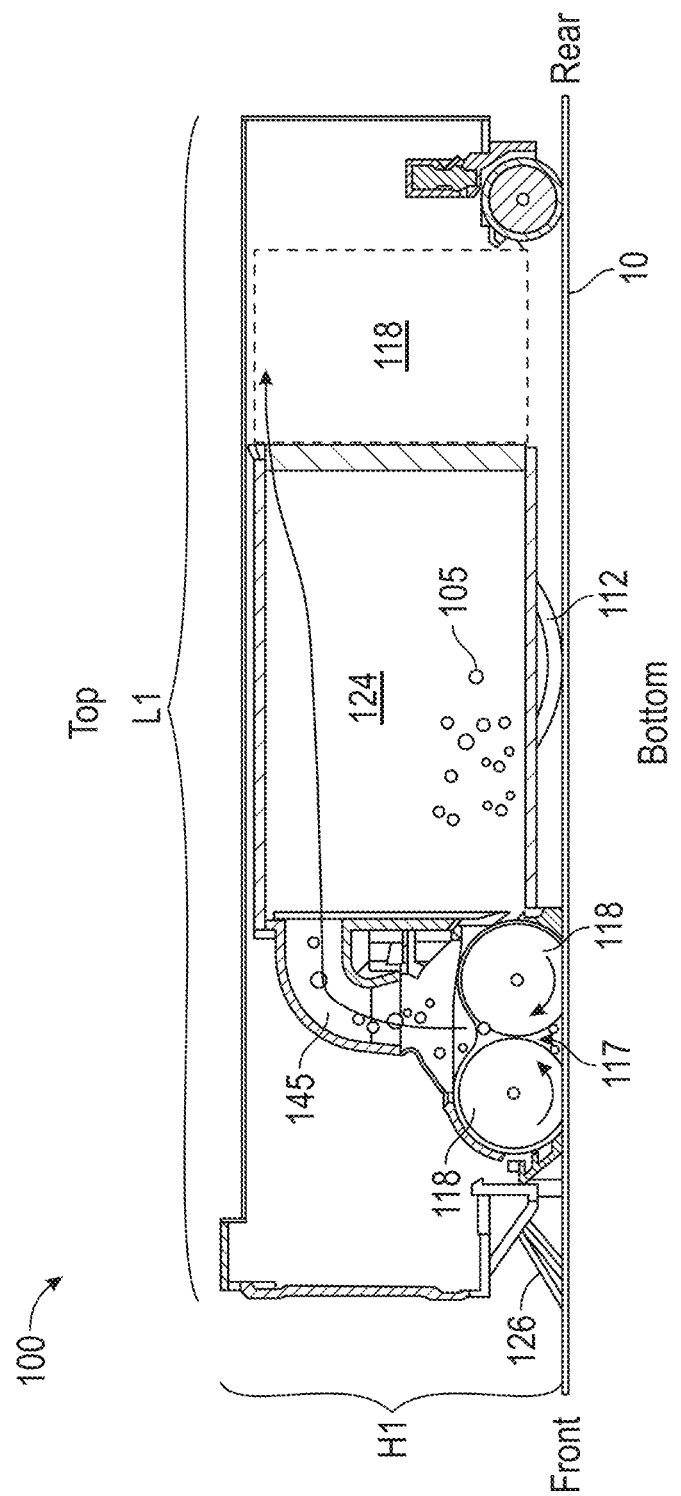
FIGS. 1, 2A, and 2B are side cross-sectional, bottom, and top perspective views of a mobile robot.
Figure 2A:
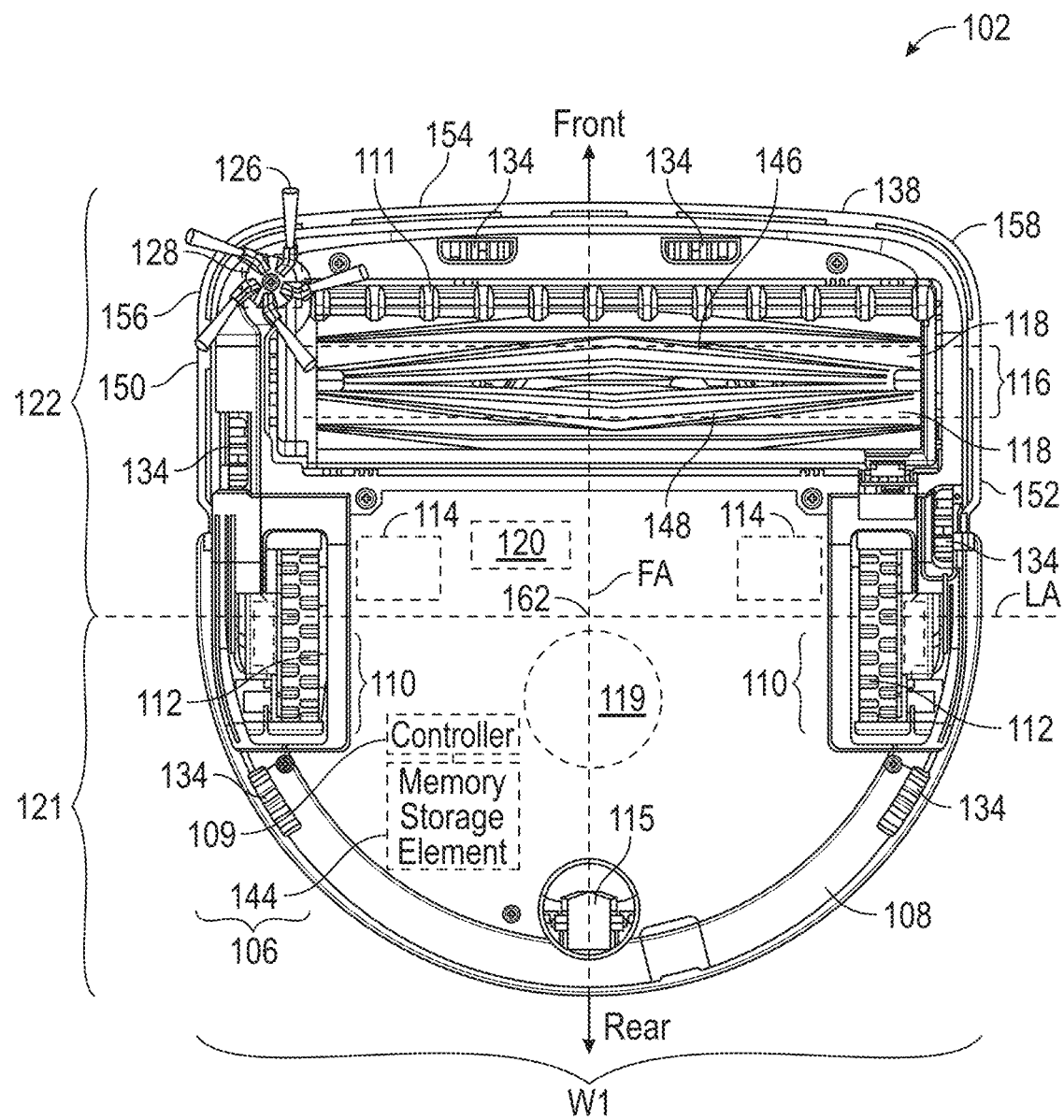
Figure 2B:
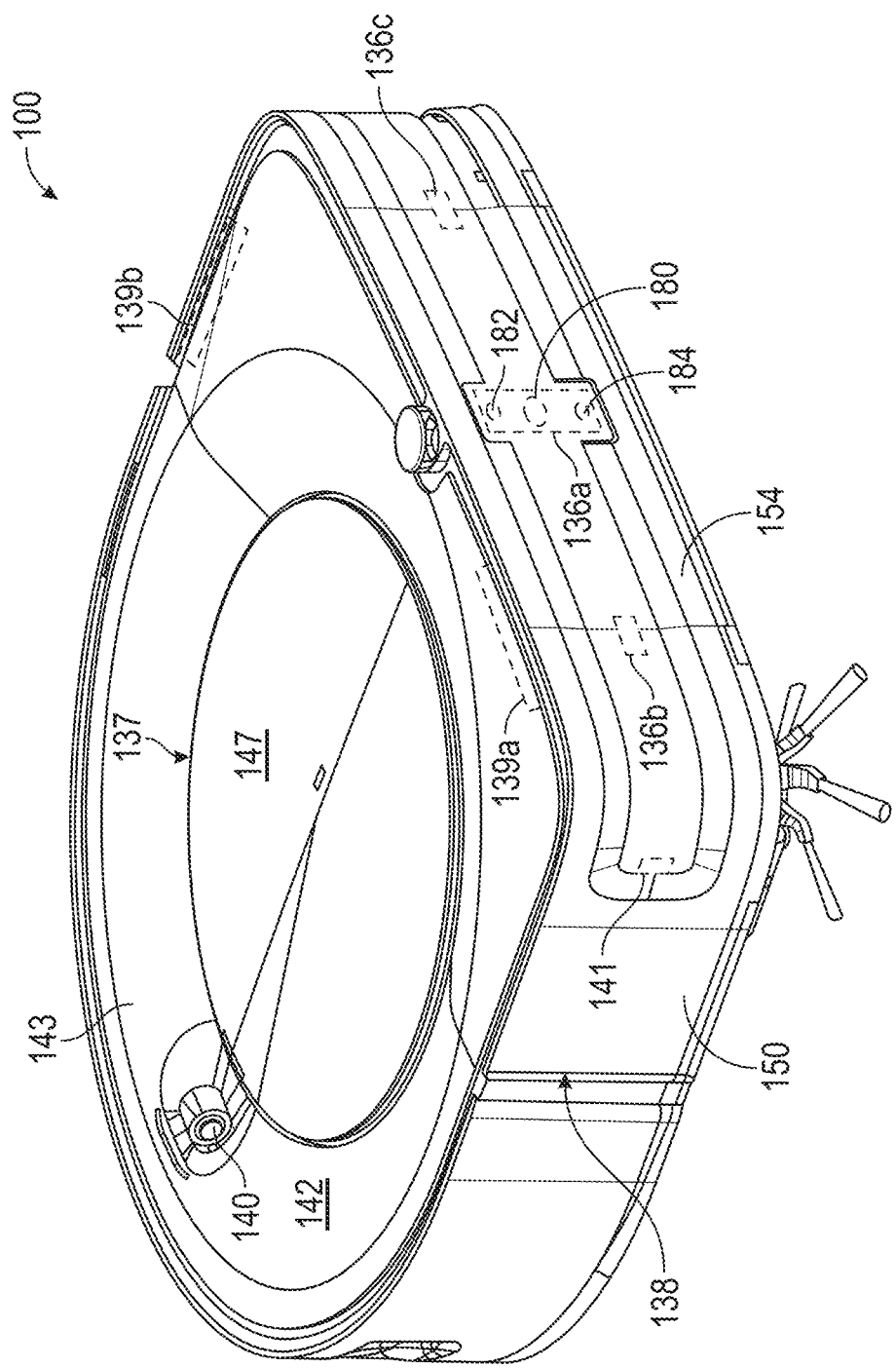

FIGS. 1 and 2A-2B depict different views of an example of a mobile robot, such as mobile cleaning robot 100. As shown in FIG. 1, the mobile cleaning robot 100 can collect debris 105 from the floor surface 10 as the mobile cleaning robot 100 traverses the floor surface 10. FIG. 2A shows an example of the mobile cleaning robot 100, such as can include a robot housing infrastructure 108. The housing infrastructure 108 can define a structural periphery of the mobile cleaning robot 100. The housing infrastructure 108 can include a chassis, cover, bottom plate, and bumper assembly. The mobile cleaning robot 100 can be a household robot that can have a small profile, such as to help permit the mobile cleaning robot 100 to fit under furniture within a home. In the example of FIG. 1, a height H1 of the mobile cleaning robot 100 relative to the floor surface is, for example, no more than 13 centimeters. The mobile cleaning robot 100 is also compact. An overall length L1 (shown in FIG. 1) of the mobile cleaning robot 100 and an overall width W1 (shown in FIG. 2A) are each between 30 and 60 centimeters, e.g., between 30 and 40 centimeters, between 40 and 50 centimeters, or between 50 and 60 centimeters. The overall width W1 can correspond to a width of the housing infrastructure 108 of the mobile cleaning robot 100.

The mobile cleaning robot 100 can include a drive system 110, such as can include one or more drive wheels. The drive system 110 can further include one or more electric motors, such as can include electrically driven portions, forming part of the electrical circuitry 106. The housing infrastructure 108 can support the electrical circuitry 106, which can include a controller circuit 109, within the mobile cleaning robot 100.

The drive system 110 can be configured to be operable to propel the mobile cleaning robot 100 across the floor surface 10. The mobile cleaning robot 100 can be propelled in a forward drive direction F or a rearward drive direction R. The mobile cleaning robot 100 can also be propelled such that the mobile cleaning robot 100 can turn, such as to turn in place, or to turn while moving in the forward drive direction F or the rearward drive direction R. In FIG. 2A, the mobile cleaning robot 100 can include drive wheels 112, such as extending through a bottom portion 113 of the housing infrastructure 108. The drive wheels 112 can be rotated by respective motors 114, such as to cause movement of the mobile cleaning robot 100 along the floor surface 10. The mobile cleaning robot 100 can further include a passive wheel, such as a passive caster wheel 115, such as extending through the bottom portion 113 of the housing infrastructure 108. The caster wheel 115 need not be powered. Together, the drive wheels 112 and the caster wheel 115 can cooperate to support the housing infrastructure 108 above the floor surface 10. For example, the caster wheel 115 can be disposed along a rearward portion 121 of the housing infrastructure 108, and the drive wheels 112 can be disposed forward of the caster wheel 115.

In FIG. 2B, the mobile cleaning robot 100 can include a forward portion 122 that can be substantially rectangular and a rearward portion 121 that can be curved, e.g., such as substantially semicircular. The forward portion 122 can include side surfaces 150, 152, a forward surface 154, and corner surfaces 156, 158. The corner surfaces 156, 158 of the forward portions 122 can connect the side surface 150, 152 to the forward surface 154.

In FIGS. 1 and 2A-2B, the mobile cleaning robot 100 can include a cleaning head assembly 116 (such as shown in FIG. 2A) such as can be configured to be operable to clean the floor surface 10. For example, the mobile cleaning robot 100 can be a vacuum cleaning robot in which the cleaning head assembly 116 can be configured to be operable to clean the floor surface 10 by ingesting debris 105 (such as shown in FIG. 1) from the floor surface 10. The cleaning head assembly 116 can include a cleaning inlet 117 through which debris can be collected by the mobile cleaning robot 100. The cleaning inlet 117 can be located forward of a center of the mobile cleaning robot 100, e.g., forward of a center 162, and along the forward portion 122 of the mobile cleaning robot 100 between the side surfaces 150, 152 of the forward portion 122.

The cleaning head assembly 116 can include one or more rotatable members 118, such as can be driven by a roller motor 120. The rotatable members 118 can extend horizontally across the forward portion 122 of the mobile cleaning robot 100. The rotatable members 118 can be located along a forward portion 122 of the housing infrastructure 108. The rotatable member 118 can extend along 75% to 95% of a width of the forward portion 122 of the housing infrastructure 108, e.g., corresponding to an overall width W1 of the mobile cleaning robot 100. In FIG. 1, the cleaning inlet 117 can be located between the rotatable members 118.

In FIG. 1, the rotatable members 118 can include rollers that counter rotate relative to one another. For example, the rotatable members 118 can include a front roller and a rear roller mounted parallel to the floor surface and spaced apart from one another by a small elongated gap. The rotatable members 118 can be rotatable about parallel horizontal axes 146, 148 (shown in FIG. 2A) such as to agitate debris 105 on the floor surface 10 and direct the debris 105 toward the cleaning inlet 117, into the cleaning inlet 117, and into a suction pathway 145 (shown in FIG. 1) in the mobile cleaning robot 100. In FIG. 2A, the rotatable members 118 can be positioned entirely within the forward portion 122 of the mobile cleaning robot 100. The rotatable members 118 can include elastomeric shells that can contact debris 105 on the floor surface 10 to direct debris 105 through the cleaning inlet 117 between the rotatable members 118 and into an interior of the mobile cleaning robot 100, e.g., into a debris bin 124 (shown in FIG. 1), as the rotatable members 118 rotate relative to the housing infrastructure 108. The rotatable members 118 can further contact the floor surface 10 to agitate debris 105 on the floor surface 10. In FIG. 2A, the rotatable members 118, such as front and rear rollers, can each feature a pattern of chevron-shaped vanes distributed along its cylindrical exterior, and the vanes of at least one roller can make contact with the floor surface along the length of the roller and experience a consistently applied friction force during rotation that is not present with brushes having pliable bristles.

The rotatable members 118 may take other suitable configurations. For example, at least one of the front and rear rollers may include bristles and/or elongated pliable flaps for agitating the floor surface. In an example, a flapper brush, rotatably coupled to the cleaning head assembly housing, can include a compliant flap extending radially outward from the core such as to sweep a floor surface as the roller is driven to rotate. The flap ca be configured to inhibit or prevent errant filaments from spooling tightly about the core, such as to help aid subsequent removal of the filaments. The flapper brush can include axial end guards mounted on the core adjacent the ends of the outer core surface and configured to inhibit or prevent spooled filaments from traversing axially from the outer core surface onto the mounting features. The flapper brush can include multiple floor cleaning bristles extending radially outward from the core.

The mobile cleaning robot 100 can further include a vacuum system 119 that can be configured to be operable to generate an airflow through the cleaning inlet 117 between the rotatable members 118 and into the debris bin 124. The vacuum system 119 can include an impeller and a motor to rotate the impeller to generate the airflow. The vacuum system 119 can be configured to cooperate with the cleaning head assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The mobile cleaning robot 100 can further include a brush 126 (also referred to as a side brush) such as can rotate about a non-horizontal axis, e.g., an axis forming an angle between 75 degrees and 90 degrees with the floor surface 10. The non-horizontal axis, for example, can form an angle between 75 degrees and 90 degrees with the longitudinal axes of the rotatable members 118. The mobile cleaning robot 100 can include a brush motor 128 operably connected to the side brush 126 to rotate the side brush 126.

The brush 126 is a side brush laterally offset from a fore-aft axis FA of the mobile cleaning robot 100 such as to permit the brush 126 to extend beyond an outer perimeter of the housing infrastructure 108 of the mobile cleaning robot 100. For example, the brush 126 can extend beyond one of the side surfaces 150, 152 of the mobile cleaning robot 100 and can thereby be capable of engaging debris on portions of the floor surface 10 that the rotatable members 118 typically cannot reach, e.g., portions of the floor surface 10 outside of a portion of the floor surface 10 directly underneath the mobile cleaning robot 100. The brush 126 can also be forwardly offset from a lateral axis LA of the mobile cleaning robot 100 such that the brush 126 also extends beyond the forward surface 154 of the housing infrastructure 108. In FIG. 2A, the brush 126 can extend beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 can be positioned to contact the floor surface 10 during its rotation so that the brush 126 can easily engage the debris 105 on the floor surface 10.

The brush 126 can be rotatable about the non-horizontal axis in a manner that brushes debris on the floor surface 10 into a cleaning path of the cleaning head assembly 116 as the mobile cleaning robot 100 moves. For example, when the mobile cleaning robot 100 is moving in the forward drive direction F, the brush 126 can be rotatable in a clockwise direction (when viewed from a perspective above the mobile cleaning robot 100) such that debris that the brush 126 contacts moves toward the cleaning head assembly and toward a portion of the floor surface 10 in front of the cleaning head assembly 116 in the forward drive direction F. As a result, as the mobile cleaning robot 100 moves in the forward drive direction F, the cleaning inlet 117 of the mobile cleaning robot 100 can collect the debris swept by the brush 126. When the mobile cleaning robot 100 is moving in the rearward drive direction R, the brush 126 can be rotatable in a counterclockwise direction (when viewed from a perspective above the mobile cleaning robot 100) such that debris that the brush 126 contacts moves toward a portion of the floor surface 10 behind the cleaning head assembly 116 in the rearward drive direction R. As a result, as the mobile cleaning robot 100 moves in the rearward drive direction R, the cleaning inlet 117 of the mobile cleaning robot 100 can collect the debris swept by the brush 126.

The electrical circuitry 106 can include, in addition to the controller circuit 109, a memory storage element 144 and a sensor system with one or more electrical sensors, for example. The sensor system can generate a signal indicative of a current location of the mobile cleaning robot 100. The sensor system can generate signals indicative of locations of or movement of the mobile cleaning robot 100 as the mobile cleaning robot 100 travels along the floor surface 10. The controller circuit 109 can be configured to execute instructions to perform one or more operations as described herein. The memory storage element 144 can be accessible by the controller circuit 109 and can be disposed within the housing infrastructure 108. The one or more electrical sensors can be configured to detect one or more features in an environment of the mobile cleaning robot 100. In FIG. 2A, the sensor system can include one or more cliff sensors 134 such as can be disposed along the bottom portion 113 of the housing infrastructure 108. Each of the cliff sensors 134 can include an optical sensor that can detect the presence or the absence of an object below the optical sensor, such as the presence or absence of the floor surface 10. The cliff sensors 134 can thus detect obstacles such as drop-offs and cliffs below portions of the mobile cleaning robot 100 where the cliff sensors 134 are disposed and can provide information to the controller circuit 109 to redirect the robot accordingly. More details of the sensor system and the controller circuit 109 are described below, such as with reference to FIG. 3.

In FIG. 2B, the sensor system can include one or more proximity sensors that can detect objects along the floor surface 10 that are near the mobile cleaning robot 100. For example, the sensor system can include proximity sensors 136a, 136b, 136c such as can be disposed proximate the forward surface 154 of the housing infrastructure 108. Each of the proximity sensors 136a, 136b, 136c can include an optical sensor facing outward from the forward surface 154 of the housing infrastructure 108 and that can detect the presence or the absence of an object in front of the optical sensor, such as can provide an adjacency sensor to generate adjacency sensor data. For example, the detectable objects can include one or more obstacles such as furniture, walls, persons, and other objects in the environment of the mobile cleaning robot 100. When configured as an adjacency sensor, such sensors can indicate whether an object is adjacent to or in contact with the mobile cleaning robot 100.

The sensor system can include a bumper system, such as can include the bumper 138 and one or more bump sensors such as can be configured to detect contact between the bumper 138 and one or more obstacles in the environment. The bumper 138 can form part of the housing infrastructure 108. For example, the bumper 138 can form the side surfaces 150, 152 as well as the forward surface 154. The sensor system, for example, can include the bump sensors 139a, 139b. The bump sensors 139a, 139b can include one or more of a break beam sensor, a capacitive sensor, or one or more other sensors such as can detect contact between the mobile cleaning robot 100, e.g., the bumper 138, and one or more objects in the environment. For example, the bump sensor 139a can be used to detect movement of the bumper 138 along the fore-aft axis FA (shown in FIG. 2A) of the mobile cleaning robot 100, and the bump sensor 139b can be used to detect movement of the bumper 138 along the lateral axis LA (shown in FIG. 2A) of the mobile cleaning robot 100. The proximity sensors 136a, 136b, 136c can detect adjacent objects before the mobile cleaning robot 100 contacts the objects, and the bump sensors 139a, 139b can detect objects that contact the bumper 138, e.g., in response to the mobile cleaning robot 100 bumping into or similarly contacting the objects.

The sensor system can include one or more obstacle following sensors. For example, the mobile cleaning robot 100 can include an obstacle following sensor 141 along the side surface 150. The obstacle following sensor 141 can include an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the mobile cleaning robot 100 and perpendicular to the side surface 150 of the mobile cleaning robot 100. For example, the detectable objects can include adjacent obstacles such as furniture, walls, persons, and other objects in the environment of the mobile cleaning robot 100. The sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In an example, the left obstacle following can be used to determine a distance between an object, e.g., an obstacle surface, to the left of the mobile cleaning robot 100 and the mobile cleaning robot 100, and the right obstacle following sensor can be used to determine a distance between an object, e.g., an obstacle surface, to the right of the mobile cleaning robot 100 and the mobile cleaning robot 100.

In some implementations, at least some of the proximity sensors 136a, 136b, 136c, and the obstacle following sensor 141 can include an optical emitter and an optical detector. The optical emitter can emit an optical beam outward from the mobile cleaning robot 100, e.g., outward in a horizontal direction, and the optical detector can detect a reflection of the optical beam that reflects off an object near the mobile cleaning robot 100. The mobile cleaning robot 100, e.g., using the controller circuit 109, can determine a time-of-flight (ToF) of the optical beam and can thereby determine a distance between the optical detector and the object, and hence a distance between the mobile cleaning robot 100 and the object.

The proximity sensor 136a can include an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the emitted optical beams. In some implementations, the optical detector 180 can include an imaging sensor, a camera, or some other type of detection device for sensing optical signals. In some implementations, the optical beams can illuminate horizontal lines along a planar vertical surface forward of the mobile cleaning robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacle surfaces adjacent to one another. The optical detector 180 can capture an image representative of the grid of dots formed by the optical emitter 182 and the grid of dots formed by the optical emitter 184. Based on a size of a dot in the image, the mobile cleaning robot 100 can determine a distance of an object on which the dot appears relative to the optical detector 180, e.g., relative to the mobile cleaning robot 100. The mobile cleaning robot 100 can make this determination for each of the dots, thus allowing the mobile cleaning robot 100 to determine a shape of an object on which the dots appear. In addition, if multiple objects are ahead of the mobile cleaning robot 100, the mobile cleaning robot 100 can determine a shape of each of the objects. In some implementations, the objects can include one or more objects that are laterally offset from a portion of the floor surface 10 directly in front of the mobile cleaning robot 100.

The sensor system can further include an optional image capture device 140, e.g., a camera, directed toward a top portion 142 of the housing infrastructure 108. The image capture device 140 can generate digital imagery of the environment of the mobile cleaning robot 100 such as while the mobile cleaning robot 100 moves about the floor surface 10. The image capture device 140 can be angled in an upward direction, e.g., angled between 30 degrees and 80 degrees from the floor surface 10 about which the mobile cleaning robot 100 navigates. The camera, when angled upward, can be configured able to capture visual images of wall surfaces of the environment so that visual features corresponding to objects on the wall surfaces can be used as landmarks for localization.

When the controller circuit 109 causes the mobile cleaning robot 100 to initiate or perform the mission, the controller circuit 109 operates the motors 114 to drive the drive wheels 112 and propel the mobile cleaning robot 100 along the floor surface 10. In addition, the controller circuit 109 operates the roller motor 120 to cause the rotatable members 118 to rotate, operates the brush motor 128 to cause the side brush 126 to rotate, and operates the motor of the vacuum system 119 to generate the airflow. To cause the mobile cleaning robot 100 to perform various navigational and cleaning behaviors, the controller circuit 109 can executes instructions that can be stored on the memory storage element 144 such as to cause the mobile cleaning robot 100 to perform by operating one or more motors of the mobile cleaning robot 100. The controller circuit 109 can operate the various motors of the mobile cleaning robot 100 to cause the mobile cleaning robot 100 to perform the behaviors.

The sensor system can further include one or more odometry sensors such as for tracking a distance travelled by the mobile cleaning robot 100. For example, the sensor system can include one or more encoders respectively associated with the motors 114 for the drive wheels 112. These encoders can track a distance that the mobile cleaning robot 100 has travelled. The sensor system can include an optical sensor such as facing downward toward a floor surface. The optical sensor can be an optical mouse sensor. For example, the optical sensor can be positioned to direct light through a bottom surface of the mobile cleaning robot 100 toward the floor surface 10. The optical sensor can detect reflections of the light and can detect a distance travelled by the mobile cleaning robot 100, such as based on one or more changes in floor features as the mobile cleaning robot 100 travels along the floor surface 10.

The controller circuit 109 can use data collected by one or more of the sensors of the sensor system such as to control navigational behaviors of the mobile cleaning robot 100 during the mission. For example, the controller circuit 109 can use the sensor data collected by obstacle detection sensors of the mobile cleaning robot 100, e.g., the cliff sensors 134, the proximity sensors 136a, 136b, 136c, and the bump sensors 139a, 139b, to enable the mobile cleaning robot 100 to avoid obstacles or to prevent the mobile cleaning robot 100 from falling down stairs within the environment of the mobile cleaning robot 100 during the mission. The controller circuit 109 can control the navigational behavior of the mobile cleaning robot 100 using information about the environment, such as a map of the environment. With proper navigation, the mobile cleaning robot 100 can be able to reach a goal position or to complete a coverage mission as efficiently and as reliably as possible.

The sensor data can be used by the controller circuit 109 for simultaneous localization and mapping (SLAM) techniques, such as in which the controller circuit 109 extracts one or more features of the environment represented by the sensor data and constructs a map of the floor surface 10 of the environment. The sensor data collected by the image capture device 140 can be used for techniques such as vision-based SLAM (VSLAM) in which the controller circuit 109 extracts visual features corresponding to objects in the environment and constructs the map using these visual features as visual landmarks. As the controller circuit 109 directs the mobile cleaning robot 100 about the floor surface 10 during the mission, the controller circuit 109 can use SLAM techniques to determine a location of the mobile cleaning robot 100 within the map by detecting visual features represented in collected sensor data and comparing the visual features to previously stored visual features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory storage element 144. In addition, other data generated for the SLAM techniques, including mapping data forming the map, can be stored in the memory storage element 144. These data produced during or ancillary to the mission can include persistent data that are produced during the mission and that are usable during a further mission. For example, the mission can be a first mission, and the further mission can be a second mission occurring after the first mission. In addition to storing the software for causing the mobile cleaning robot 100 to perform its behaviors, the memory storage element 144 can store sensor data or data resulting from processing of the sensor data for access by the controller circuit 109 from one mission to another mission. For example, the map can be a persistent map that is usable and updateable by the controller circuit 109 of the mobile cleaning robot 100 from one mission to another mission to help navigate the mobile cleaning robot 100 about the floor surface 10. The persistent map can be updated in response to instruction commands received from a user. The controller circuit 109 can modify subsequent or future navigational behaviors of the mobile cleaning robot 100 such as according to the updated persistent map, such as by modifying the planned path or updating obstacle avoidance strategy.

The persistent data, including the persistent map, can be used to help enable the mobile cleaning robot 100 to efficiently clean the floor surface 10. For example, the persistent map can enable the controller circuit 109 to direct the mobile cleaning robot 100 toward open floor space and to avoid non-traversable space. Also, for subsequent missions, the controller circuit 109 can plan navigation of the mobile cleaning robot 100 through the environment using the persistent map to control, improve, or optimize paths taken during the missions.

The mobile cleaning robot 100 can include a light indicator system 137 such as can be located on the top portion 142 of the mobile cleaning robot 100. The light indicator system 137 can include one or more light sources positioned within a lid 147 covering the debris bin 124 (shown in FIG. 2A). The light sources can be positioned to direct light to a periphery of the lid 147. The light sources can be positioned such that any portion of a continuous loop 143 on the top portion 142 of the mobile cleaning robot 100 can be illuminated. The continuous loop 143 can be located on a recessed portion of the top portion 142 of the mobile cleaning robot 100 such that the light sources can illuminate a surface of the mobile cleaning robot 100 as the light sources are activated.

Figure 3:
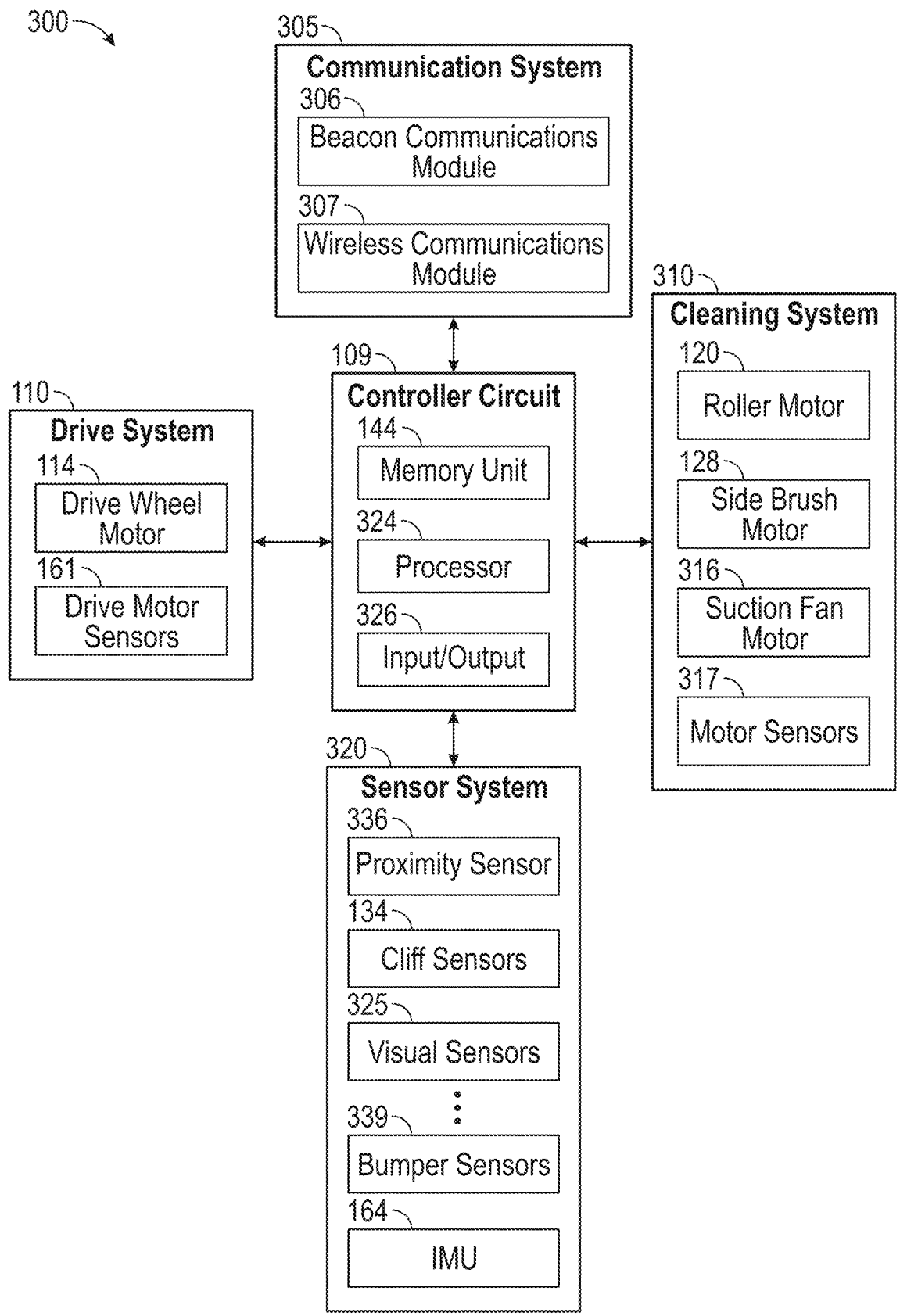
FIG. 3 is a diagram illustrating an example of a control architecture for operating a mobile cleaning robot.

FIG. 3 is a diagram illustrating an example of a control architecture 300 for operating a mobile cleaning robot such as the mobile cleaning robot 100. The controller circuit 109 can be communicatively coupled to various subsystems of the mobile cleaning robot 100, including a communications system 305, a cleaning system 310, a drive system 110, and a sensor system 320. The controller circuit 109 can include or be coupled to a memory storage element 144 that can hold data and instructions for processing by a processor 324. The processor 324 can receive program instructions and sensor feedback or other operational data from the memory storage element 144, can executes logical or other operations called for by the program instructions, and can generate command signals for operating the respective subsystem components of the mobile cleaning robot 100. An input/output unit 326 can transmit the command signals and can receive feedback from the various illustrated components.

The communications system 305 can include a beacon communications module 306 and a wireless communications module 307. The beacon communications module 306 may be communicatively coupled to the controller circuit 109. The beacon communications module 306 can be configured to be operable to send and receive signals to and from a remote device. For example, the beacon communications module 306 may detect a navigation signal projected from an emitter of a navigation or virtual wall beacon or a homing signal projected from the emitter of a docking station. Illustrative examples of docking, confinement, home base, and homing technologies are described in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 can facilitate the communication of information describing a status of the mobile cleaning robot 100 over a suitable wireless network (e.g., a wireless local area network) with one or more mobile devices (e.g., mobile device 404 shown in FIG. 4A). More details of the communications system 305 are described below, such as with reference to FIG. 4A.

The cleaning system 310 can include the roller motor 120, a brush motor 128 driving the side brush 126, and a suction fan motor 316 powering the vacuum system 119. The cleaning system 310 can further include multiple motor sensors 317 such as can monitor operation of the roller motor 120, the brush motor 128, and the suction fan motor 316, such as to facilitate closed-loop control of the motors by the controller circuit 109. The roller motor 120 can be operated by the controller circuit 109 (or a suitable microcontroller) to drive the rollers (e.g., rotatable members 118) according to a particular speed setting such as via a closed-loop pulse-width modulation (PWM) technique, in which a feedback signal can be received from a motor sensor 317 monitoring a signal indicative of the rotational speed of the roller motor 120. For example, such a motor sensor 317 may be provided in the form of a motor current sensor (e.g., a shunt resistor, a current-sensing transformer, and/or a Hall Effect current sensor).

The drive system 110 can include a drive-wheel motor 114 for operating one or both of the drive wheels 112 such as in response to one or more drive commands or control signals from the controller circuit 109, as well as multiple drive motor sensors 161 such as to facilitate closed-loop control of the drive wheels (e.g., via a suitable PWM technique such as described above). For example, a microcontroller can be assigned to the drive system 110 and configured to decipher drive commands having x, y, and θ components. The controller circuit 109 may issue individual control signals to the drive wheel motor 114. The controller circuit 109 can maneuver the mobile cleaning robot 100 in any desired direction across a cleaning surface such as by independently controlling the rotational speed and direction of each drive wheel 112 via the drive-wheel motor 114.

The controller circuit 109 can operate the drive system 110 in response to one or more signals received from the sensor system 320. For example, the controller circuit 109 may operate the drive system 110 to redirect the mobile cleaning robot 100 to avoid obstacles and clutter encountered while treating a floor surface. In another example, if the mobile cleaning robot 100 becomes stuck or entangled during use, the controller circuit 109 may operate the drive system 110 according to one or more escape behaviors. To achieve reliable autonomous movement, the sensor system 320 may include several different types of sensors that can be used in combination with one another to allow the mobile cleaning robot 100 to make intelligent decisions about a particular environment. For example, the sensor system 320 can include one or more of proximity sensors 336 (such as the proximity sensors 136a-136c), the cliff sensors 134, a visual sensor 325 such as the image capture device 140 configured for detecting features and landmarks in the operating environment and building a virtual map, such as using VSLAM technology, as described above.

The sensor system 320 may further include bumper sensors 339 (such as the bumper sensors 139a and 139b), responsive to activation of the bumper 138. The sensor system 320 can include an inertial measurement unit (IMU) 164 that is, in part, responsive to changes in position or motion of the mobile cleaning robot 100 with respect to a vertical axis substantially perpendicular to the floor. For example, the IMU 164 can senses when the mobile cleaning robot 100 is pitched at a floor type interface having a difference in height, which is potentially attributable to a flooring type change. In some examples, the IMU 164 can include a six-axis IMU having a gyro sensor that can measure the angular velocity of the mobile cleaning robot 100 relative to the vertical axis. However, other suitable configurations are also contemplated. For example, the IMU 164 may include an accelerometer sensitive to the linear acceleration of the mobile cleaning robot 100 along the vertical axis. Output from the IMU 164 can be received by the controller circuit 109 and processed, such as to detect a discontinuity in the floor surface across which the mobile cleaning robot 100 is traveling. The terms "flooring discontinuity" and "threshold" refer to any irregularity in the floor surface (e.g., a change in flooring type or change in elevation at a flooring interface) that is traversable by the mobile cleaning robot 100, but that causes a discrete vertical movement event (e.g., an upward or downward "bump"). The vertical movement event can refer to a part of the drive system (e.g., one of the drive wheels 112) or the chassis of the robot housing 108, depending on the configuration and placement of the IMU 164. Detection of a flooring threshold, or flooring interface, may prompt the controller circuit 109 to expect a change in floor type. For example, the mobile cleaning robot 100 may experience a significant downward vertical bump as it moves from high pile carpet (a soft floor surface) to a tile floor (a hard floor surface), and an upward bump in the opposite case.

A wide variety of other types of sensors may be incorporated in the sensor system 320 (or any other subsystem). Such sensors may be configured to function as one or more of an obstacle detection units, an obstacle detection obstacle avoidance (ODOA) sensor, a wheel drop sensor, an obstacle-following sensor, a stall-sensor unit, a drive-wheel encoder unit, a bumper sensors, or the like.

Examples of Communication Networks

Figure 4A:
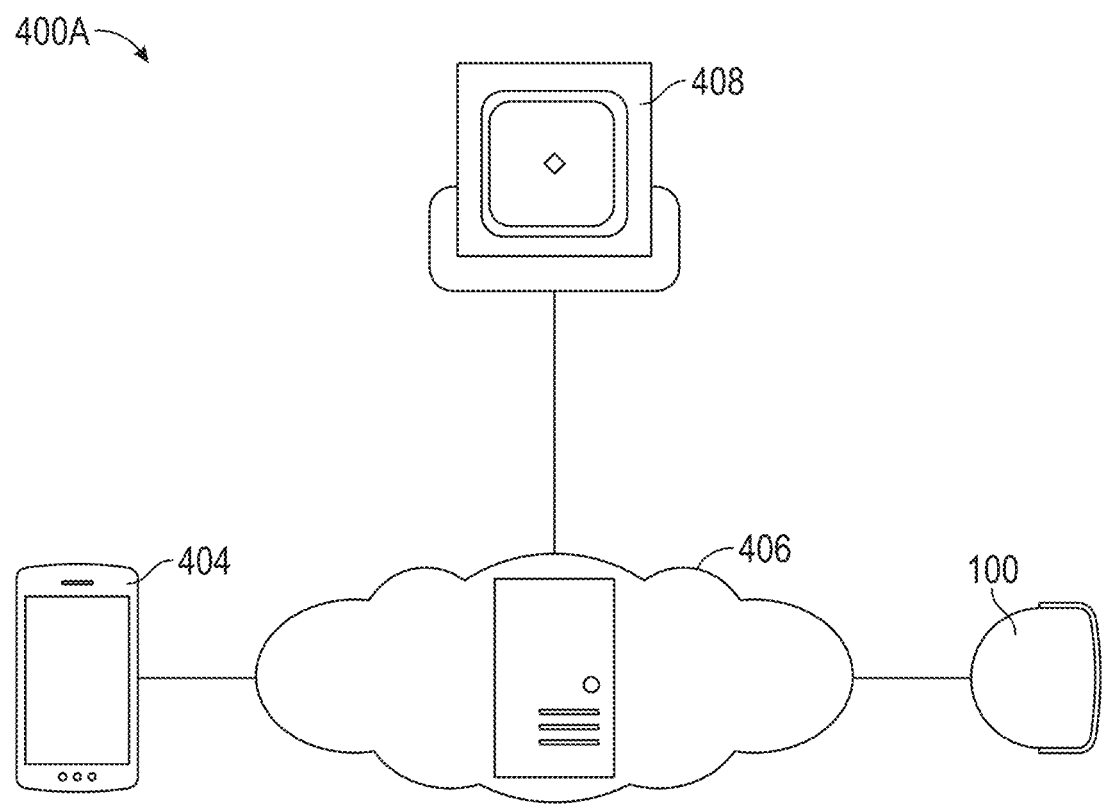
FIG. 4A is a diagram illustrating an example of a communication network in which a mobile cleaning robot operates and data transmission in the network.

FIG. 4A is a diagram illustrating an example of a communication network 400A such as can enable networking between the mobile cleaning robot 100 and one or more other devices, such as a mobile device 404, a cloud computing system 406, or another autonomous robot 408 separate from the mobile device 404. Using the communication network 400A, the mobile cleaning robot 100, the mobile device 404, the robot 408, and the cloud computing system 406 can communicate with one another to transmit data to one another and receive data from one another. In some implementations, the mobile cleaning robot 100, the robot 408, or both the mobile cleaning robot 100 and the robot 408 communicate with the mobile device 404 through the cloud computing system 406. Alternatively or additionally, the mobile cleaning robot 100, the robot 408, or both the mobile cleaning robot 100 and the robot 408 can communicate directly with the mobile device 404. Various types and combinations of wireless networks (e.g., Bluetooth, radio frequency, optical based, etc.) and network architectures (e.g., mesh networks) may be employed by the communication network 400A.

In FIG. 4A, the mobile device 404 can include a remote device that can be linked to the cloud computing system 406, such as can enable a user to provide one or more inputs on the mobile device 404. The mobile device 404 can include one or more user input elements such as, for example, one or more of a touchscreen display, buttons, a microphone, a mouse, a keyboard, or other devices that respond to input provided by the user. The mobile device 404 can alternatively or additionally include immersive media (e.g., virtual reality) with which the user interacts to provide a user input. Examples of such a mobile device 404 can include a virtual reality headset or a head-mounted display. The user can provide inputs corresponding to commands for the mobile device 404. In such cases, the mobile device 404 transmits a signal to the cloud computing system 406 to cause the cloud computing system 406 to transmit a command signal to the mobile cleaning robot 100. In some implementations, the mobile device 404 can present augmented reality images. In some implementations, the mobile device 404 can include a smart phone, a laptop computer, a tablet computing device, or other mobile device.

The mobile device 404 may include a user interface such as can be configured to display a map of the robot environment. Robot path, such as that identified by the coverage planner of the controller circuit 109, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that benefits from repeated cleaning); restricting a robot traversal direction or traversal pattern in a portion of the environment; or adding or changing a zone's cleaning rank, among others.

The communication network 400A can include additional nodes, such as additional robots or additional network-connected devices. For example, a network-connected device can generate information about the environment 20. The network-connected device can include one or more sensors such as to detect one or more features in the environment 20, such as an acoustic sensor, an image capture system, or other sensor generating a signal from which one or more features can be extracted. Network-connected devices can include home cameras, smart sensors, or the like.

In the communication network 400A depicted in FIG. 4A and in other implementations of the communication network 400A, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Examples of Adjacency-Derived Landmark Features

Various examples of systems, devices, and processes of using adjacency-derived landmark features for robot localization and mapping are described in the following, such that the camera or other image capture device 140 mentioned above, or other "at-a-distance" sensor need not be included or used. Instead, adjacency sensor data and motion sensor data can be used for robot localization, such as described below.

Thus, the present techniques can use adjacency-derived landmark features, such as for robot localization and mapping of environment. This approach need not rely on an "at-a-distance" sensor. The present approach can include, can build upon, or can be used in combination with one or more of the techniques described in commonly-assigned Vincenti U.S. Pat. No. 9,630,319, entitled LOCALIZATION AND MAPPING USING PHYSICAL FEATURES, which is hereby incorporated herein by reference in its entirety, including its description of robot localization and mapping that need not rely on an "at-a-distance" sensor.

An example of an approach to robot localization and mapping involving an "at-a-distance" sensor is Vision-based Simultaneous Localization And Mapping (VSLAM). VSLAM can involve using a camera onboard the robot as an imaging device, such as to provide a steady-stream of "at-a-distance" visual images of the environment. The visual images can include recognizable or previously recognized "at-a-distance" visual landmarks. Image processing techniques can be used to process these visual images from the camera, such as to extract information about a distance and orientation of the visual landmark with respect to a position or pose of the robot. Such information, including the distance of the visual landmark from the robot and the orientation of the visual landmark with respect to the robot, can be used to determine, from the camera images, a location or pose of the robot within an environment that has been mapped, such that a stored map of the environment includes stored information about the visual landmarks.

The present techniques can involve using an "adjacency sensor" instead of requiring an "at-a-distance" sensor such as a camera or a light detection and ranging (LIDAR) sensor or the like. While using an adjacency sensor can be a cheaper and more efficient approach than using a camera or other "at-a-distance" sensor, it presents a technical challenge of how to perform such localization and mapping without requiring the use of range or distance information that an "at-a-distance" sensor can provide to create or distinguish between distinctive visual landmarks. This document describes ways to use adjacency sensor data and robot motion sensor data to create or recognize adjacency-derived landmark features, such as can be used to perform robot localization and mapping (e.g., using a particle filter backend) without using an "at-a-distance" sensor, even though the adjacency-derived landmark features being used can in some ways be less distinctive than the visual landmark features such as can be provided by a camera.

An "adjacency sensor" and robot motion information can be used to create landmark features in an occupancy map of the environment, such as from the perspective of the mobile cleaning robot 100 moving about a floor or other base surface of the environment. For example, such adjacency-derived landmark features can include—or can even be limited to—straight wall segments encountered by the robot and characterized during WALL FOLLOWING behavior in which the robot is commanded by the controller 109 to "wall follow" a wall or other contiguous obstacle encountered while moving about floor of the environment, such as described in the incorporated U.S. Pat. No. 9,630,319. While it is possible to define more complex adjacency-derived landmark features, it is also desirable for the robot to be capable of operating, including re-localizing, without requiring adjacency-derived landmarks that are more complex than straight-wall segments, and allowing for the capability of maintaining robot localization using non-unique landmarks, such as those encountered earlier during that particular mission of the robot. Such a straight wall segment landmark feature can be characterized by its length and orientation in the environment—and it is possible (but not required) that more than one straight wall segment landmark feature can have the same length and orientation, such that multiple adjacency-derived straight wall segment landmark features can be non-unique, but still usable in robot localization and mapping, such as can include using the present techniques.

Such adjacency-based landmark features can be stored in a map, such as an occupancy map, a feature map, or the like. The map can be a persistent map such as can be re-used and optionally modified or augmented during later missions. The mobile cleaning robot 100 can include a sensor system, such as described herein. The sensor system can include a motion sensor to monitor movement of the mobile cleaning robot 100 about the environment. The motion sensor can include one or more odometry sensors, such as described herein, such as to provide odometry data to help monitor movement of the mobile cleaning robot 100 about the environment. The motion sensor can include an inertial sensor, such as an inertial measurement unit (IMU) such as to provide inertial data to help monitor movement of the mobile cleaning robot about the environment. For example, the inertial sensor can include an IMU 164 or another inertial sensor such as can include a gyro or accelerometer, such as described herein. The mobile cleaning robot 100 can include an adjacency sensor configured to receive adjacency sensor data indicating a wall or other object or obstacle in the environment being adjacent to or in contact with the mobile cleaning robot 100—without requiring a camera, or LIDAR or other ranging, or other "at-a-distance" information about remote objects that are not adjacent to or in contact with the mobile cleaning robot 100.

Illustrative examples of an adjacency sensor can include one or more of: a bump sensor 139, an obstacle following sensor 141, a break beam sensor, a capacitive sensor, or other local object detection sensor that can indicate whether an object is adjacent to or in contact with the mobile cleaning robot 100—without requiring using a sensor or sensing modality capable of providing a measurement of how far away a remote object is. The mobile cleaning robot 100 can include a controller circuit 109. The controller circuit 109 can control the drive system 110 to effect movement of the mobile cleaning robot 100 about the floor or other surface of the environment, such as based on one or more of adjacency sensor data, inertial sensor data, or other control input information. Camera or other imaging or other "at-a-distance" sensors are not required. The controller circuit 109 can also create or recognize adjacency-derived landmark features. This can include using the adjacency sensor data and motion sensor data to characterize a landmark feature, such as a length and orientation of a straight wall segment landmark feature, such as during a commanded WALL FOLLOWING behavior.

The landmark feature candidate can be a wall or other obstacle encountered by the mobile cleaning robot 100 as it moves about the environment. Such an encounter can be indicated by the adjacency sensor. For example, a bump sensor can indicate a location of contact with the obstacle, and a timing between spaced-apart bump sensors receiving such bump contact information can indicate an angle of approach with respect to the obstacle.

There can be at least two different types of landmark features that can be created for use with re-localization. A first type can include the geometric trajectory shapes from the trajectory path along which the robot moves. A second type can include accumulated hit data from bumps, bump-follows, and wall-follows, which can be accumulate into a point-cloud of hits. That point-cloud can then be analyzed for shapes. For example, this can include using Random Sampling Consensus (RANSAC) or other technique, such as to find consecutive lines then get angle between lines, or to look for shapes like a semi-circle). If you are bump-following a surface, the trajectory path data may be noisy, but the object shape can still be extracted from the point-cloud bump hit data.

The geometric shape of the trajectory path of the mobile cleaning robot 100 as it moves about a floor or other base surface following along the wall or other obstacle can be characterized by one or more geometric shape parameters that can be potentially distinguishable between individual landmark features. Some illustrative examples of such geometric shape parameters of the trajectory path can include, among other things, its length, its curvature, an angle presented by one or more identifiable corners or U-turns, or the like. The geometric shape of the trajectory path of the mobile cleaning robot 100 within an environment or the point-cloud data during wall-following can be used to create an adjacency-based landmark feature that can be distinguished from other adjacency-based landmark features, such as without requiring visual camera or other "at-a-distance" data.

The geometric shape of the observation trajectory path of the mobile cleaning robot 100 from a contiguous wall-following encounter with a landmark feature candidate can be compared with the geometric shape of the trajectory path of one or more stored previously identified landmark features, such as resulting from previous contiguous wall-following encounters. Additionally or alternatively, point-cloud data from bump-following or wall-following along an obstacle can be used. The adjacency-derived landmark features candidate can be used for robot localization Upon making an adjacency encounter with an obstacle, the controller circuit 109 can initiate a wall-following behavior, such as to follow a contiguous surface of the obstacle, and can optionally record an "anchor" representing a start of the wall-following, a stop of the wall-following, or both as endpoint(s) of the straight wall segment landmark feature associated with that obstacle. Recording such an anchor can optionally include recording one or more of the robot location or pose information associated with the anchor. During the wall-following the mobile cleaning robot 100 can record at least one of its position or its pose recurrently or periodically, such as at 1 cm or similar increments, such as relative to a starting anchor, during the wall-following. This document describes a technique for operating and re-localizing the robot that permits using non-unique adjacency-derived landmarks, such as can include a set of adjacency-derived landmark features that can include two or more aligned or similarly-oriented straight wall segments having identical or very similar lengths. Thus, both non-unique and unique landmarks derived using adjacency sensor data can be used for robot localization and mapping.

One or more criteria can be applied to determine whether an adjacency-derived landmark candidate should be stored as a landmark feature in a feature or other map. Illustrative examples of one or more landmark feature candidate characteristics to which one or more criteria can be applied to determine whether to declare an identified landmark feature can include one or more of: a length of the observation path trajectory; a minimum (e.g., at least 30 cm) or other distance of the observation trajectory from one or more previously identified landmark features; an orientation of the observation trajectory; an orientation of the observation trajectory with respect to one or more previously identified landmark features; a density of identified landmark features near the observation trajectory of the landmark candidate, or the like. For example, a straight wall segment landmark feature can include one or more geometric characteristics. Illustrative examples of such geometric characteristics can include one or more of a length, a starting location, an ending location, and an orientation in the environment.

One or more criteria can optionally be applied, such that identified landmark features can optionally be restricted to those presenting only straight (e.g., linear) wall segments, such as of sufficient length and joined by an angle meeting one or more criteria. Most household rooms have straight walls, and most such straight walls are oriented perpendicular to each other, such that a rectilinear wall-assumption can optionally be made. Such a rectilinear wall-assumption can provide certain benefits to one or more of robot landmark feature creation and recognition, mapping creation or modification, or robot localization.

In deciding whether a particular landmark feature candidate should be declared a newly identified landmark feature, or should be merged with a previously-identified landmark feature, the controller circuit 109 can apply one or more criteria, such as can be rules-based, algorithmically applied, or applied using a trained machine-learning (ML) model. For example, if a landmark feature candidate is too close to a previously-identified landmark feature (or in an area too-densely occupied by previously-identified landmark features), it may have less usefulness as a newly identified landmark feature, because it may not add much value to robot localization over the closely located previously-identified landmark feature(s). Or, if a landmark feature candidate is too short, to declare such a too-short landmark feature candidate to be a newly identified landmark feature might be undesirable. Such a too-short landmark feature candidate may be overly affected by or sensitive to variations in the actual trajectory path taken by the mobile cleaning robot 100 across the floor surface. Thus, such a too-short landmark feature candidate may provide less confidence in any resulting wall-following re-encounter information to be used for robot localization.

In an example, the orientation of a landmark feature candidate, such as with respect to one or more previously identified landmark features, may be useful to determine whether to declare a landmark feature candidate as a newly identified landmark feature. It can be desirable to have a mix of orientations as identified landmark features. However, it is also desirable for the robot to be capable of operating, including re-localizing using only adjacency-derived landmarks, without requiring adjacency-derived landmarks that are more complex than straight-wall segments, and allowing for the capability of maintaining robot localization using non-unique landmarks, such as those encountered earlier during that particular mission of the robot, such as described below.

Illustrative examples of one or more landmark feature candidate characteristics to which one or more criteria can be applied to determine whether to declare an identified landmark feature can include one or more of: a length of the observation path trajectory; a minimum (e.g., at least 30 cm) or other distance of the observation trajectory from one or more previously identified landmark features; an orientation of the observation trajectory; an orientation of the observation trajectory with respect to one or more previously identified landmark features; a path shape of the observation trajectory; a density of identified landmark features near the observation trajectory of the landmark candidate, or the like.

Figure 11:
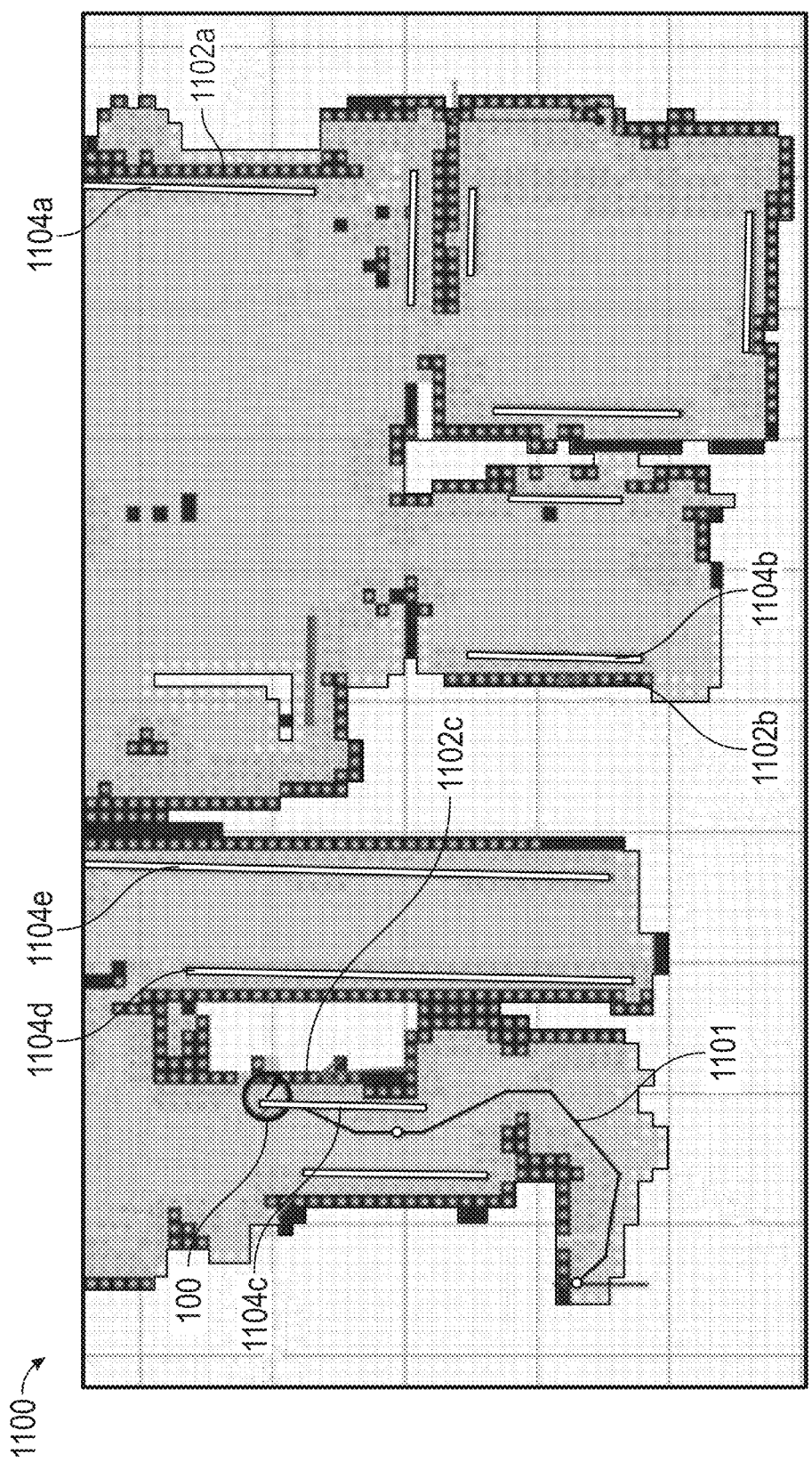
FIG. 11 shows an illustrative example of an augmented occupancy map, feature map, or other environment map such as of a floor or other base surface of a household environment.

FIG. 11 shows an illustrative example of an augmented occupancy map, feature map, or other environment map 1100 such as of a floor or other base surface of a household environment. The map 1100 shows various rooms defined by walls 1102. The map 1100 also illustrates an example of how such potentially distinguishable landmark features can be created. This can include using the geometric shape of the trajectory path created by the mobile cleaning robot 100 as the robot 100 wall-follows along one or more walls 1102 or other objects or obstacles, such as for creating wall-segment landmark features 1104 as potentially distinguishable landmark features.

In FIG. 1, the mobile cleaning robot 100 is shown as moving about a floor or other base surface of a room in the household environment and bumping into or otherwise encountering an adjacent wall 1102C. Upon encountering the adjacent wall 1102C, the controller 109 can direct the drive system 110 of the mobile cleaning robot 100 to engage in wall-following behavior, such as with the goal of looking for a contiguous straight wall segment to declare as a corresponding wall segment landmark feature 1104C. A straight wall segment landmark feature can include one or more geometric characteristics. Illustrative examples of such geometric characteristics can include one or more of a length, a starting location, an ending location, and an orientation in the environment.

In the example of FIG. 11, one or more criteria can optionally be applied, such that identified landmark features or landmark feature candidates can optionally be restricted to those presenting only straight (e.g., linear) wall segments. Such corresponding geometric trajectory shape characteristics can be determined by the controller 109 of the mobile cleaning robot 100, such as during the wall-following behavior mode. Similarly, one or more criteria can optionally be applied such that identified landmark features or landmark feature candidates can optionally be restricted to those presenting only straight (e.g., linear) and rectilinear (e.g., in only a horizontal or vertical orientation, such as shown in FIG. 11, and not at a non-perpendicular angle thereto) wall segments. Most household rooms have straight walls, and most such straight walls are oriented perpendicular to each other, such that a rectilinear wall-assumption can optionally be made. Such a rectilinear wall-assumption can provide certain benefits to one or more of robot landmark feature creation and recognition, mapping creation or modification, or robot localization.

Figure 12:
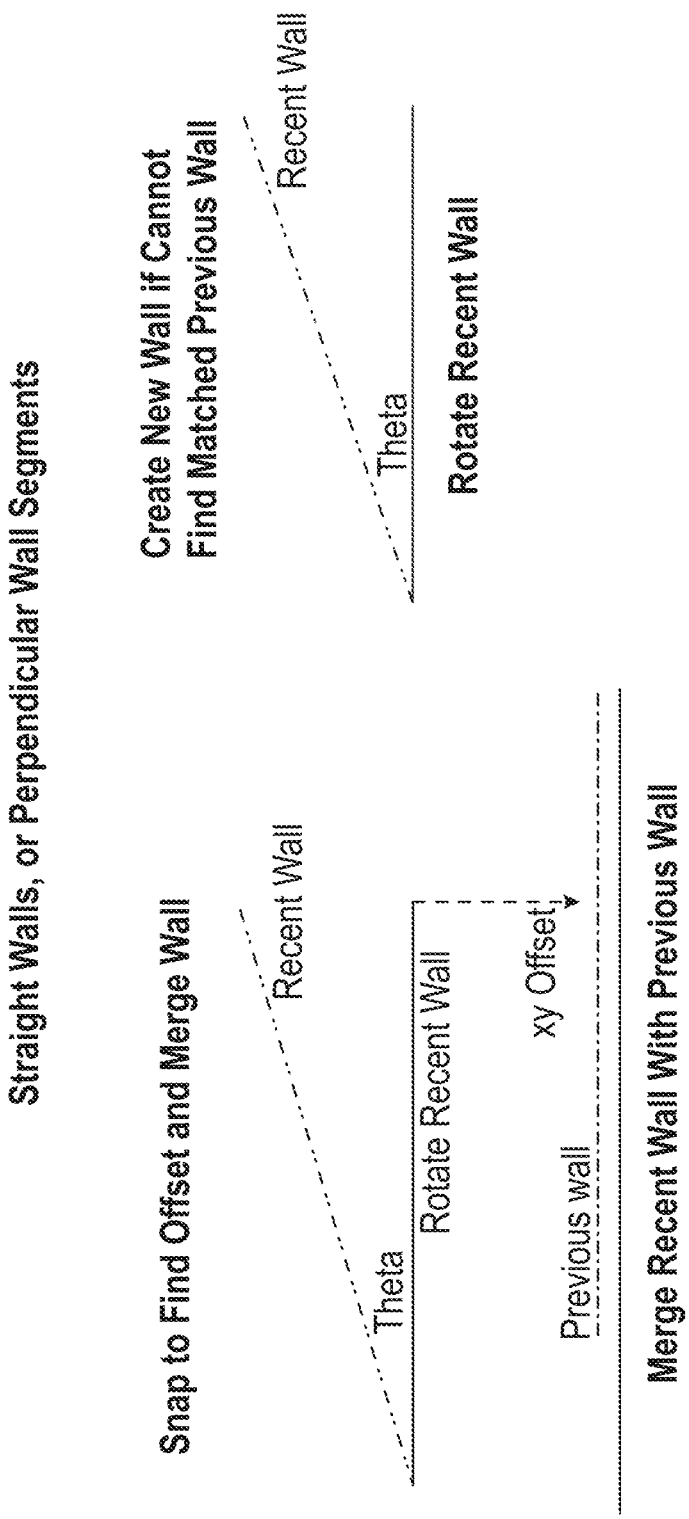
FIG. 12 shows an example in which one or both of a straight-wall restriction or a rectilinear wall-assumption can be used to perform a robot localization correction, a map correction, or both (left illustration).

FIG. 12 shows an example in which one or both of a straight-wall restriction or a rectilinear wall-assumption can be used to perform a robot localization correction, a map correction, or both (left illustration). For example, such a robot localization correction can be performed by the controller 109, for example, when a landmark feature candidate having a sufficiently straight trajectory path for a sufficient length exhibits sufficient similarity to an identified landmark feature, but at an offset angle to the identified landmark feature, wherein the offset angle is less than a specified threshold value (e.g., an offset angle of less than 10 degrees). In such a case, the landmark feature candidate can be declared similar enough to the identified landmark feature to constitute the identified landmark feature, and a rotation (e.g., using coincident corresponding origin endpoints of the landmark feature candidate and the identified landmark feature) can be performed to align the landmark feature candidate with the identified landmark feature. The actual value of the offset angle corrected by the rotation can be used as an indication of the accumulated gyro drift, and used to re-localize an angular orientation of the robot's location and pose to re-localize the gyro to reduce or eliminate such gyro drift component of the robot's location and pose. Then, an xy translation can be performed to align the landmark feature candidate with the identified landmark feature, and the amount of such xy translation used to perform such alignment can be used to reduce the xy drift component of the robot's location and pose.

In sum, the offset angle, the xy translation, and other geometric shape information about the landmark feature candidate or the identified landmark feature can optionally be used to localize the robot on the map. Such robot localization can include adjusting or correcting one or more accumulated drift components (e.g., $\Delta x$, $\Delta y$, $\Delta \theta$) of the mobile cleaning robot's location and pose coordinates (e.g., x, y, $\theta$). In the absence of encountering an identified landmark feature from which such adjustment or correction of the robot's location coordinates can be performed, the robot's location coordinates can become subject to accumulated drift error. This is because the robot's location coordinates can be subject to noise from the odometry or other motion sensors used to generate and update ongoing location information for use by the controller circuit 109 of the mobile cleaning robot 100 for controlling one or more aspects of a mission.

Additionally or alternatively, the offset angle can be used adjust the map itself. For example, the offset angle can be used to "merge" the landmark feature candidate with an identified landmark feature, such as with appropriate weighting. For example, if the previously identified landmark feature candidate was only observed once, then the merged identified landmark feature can use equal weighting to combine the location information of the landmark feature candidate with that of the previously identified landmark feature candidate. If the previously identified landmark feature candidate constituted a previously identified landmark feature that has already undergone ten previous such merges, for example, then location information of the landmark feature candidate can be given a $1/10$ weighting in forming the merged identified landmark feature. One or more other factors may be used is such weighting for merging a landmark feature candidate with an identified landmark feature. In sum, such merging can be used for mapping, such as to update an identified landmark feature on an existing map.

In the example of FIG. 12 (right illustration), if the offset angle exceeds the specified threshold value (and meets one or more other optionally-applied additional landmark feature creation criteria), then the landmark feature candidate can be declared to be a newly identified landmark feature and stored, e.g., if the rectilinear assumption is not being applied. For example, if the rectilinear assumption is being applied, then the one or more other optionally-applied criteria may include determining that the offset angle is less than a specified threshold value of angle from an orthogonal orientation that meets the particular rectilinear assumption being applied.

Returning to FIG. 11, the mobile cleaning robot 100 need not follow an exactly straight line trajectory path 1101 in moving along the floor when wall-following a straight wall. For example, using a bump sensor 139 or similar adjacency sensor, there may be some variability in the direction of the mobile cleaning robot 100 as the robot 100 wall-follows a straight wall. One or more string matching or other curve matching techniques (e.g., Wolfson's curve matching algorithm) can be performed by the controller circuit 109. Such techniques can be used, among other things, to determine when such actual trajectory paths can be considered to be "straight enough" to be representative of wall-following a straight wall In FIG. 11, merging of a landmark feature candidate with an identified landmark feature can include extending an identified landmark feature. Such extending can be carried out when the landmark feature candidate is aligned with and extends contiguously from the identified landmark feature. This can include determining whether there is sufficient locational similarity on the map to meet one or more criteria indicating that the landmark feature candidate should be regarded as an extended portion of the identified landmark feature.

For example, not all wall-following encounters with a wall obstacle necessarily begin at the same location of that wall. For this reason, different contiguous wall segment landmark features may be identified at different times during the same or different mapping or cleaning or other missions. Such different wall segments can be merged with each other (e.g., end-to-end) such as when one or more criteria indicate sufficient confidence in such segments being contiguous with each other, such as with or without an additional alignment criterion. For example, in FIG. 11, the long vertical (on the page) landmark features 1104d, 1104e on opposite sides of a hallway may respectively have been generated piecewise as wall segments at different times during the same or different missions, such as with two or more such wall segments having been merged to create such resulting merged identified landmark features.

In deciding whether a particular landmark feature candidate should be declared a newly identified landmark feature, or should be merged with a previously-identified landmark feature, the controller circuit 109 can apply one or more criteria, such as can be rules-based, algorithmically applied, or applied using a trained machine-learning (ML) model. However, such rules need not be based solely on one or more geometric shape characteristics of the trajectory path used to generate the landmark feature. For example, if a landmark feature candidate is too close to a previously-identified landmark feature (or in an area too-densely occupied by previously-identified landmark features), it may have less usefulness as a newly identified landmark feature, because it may not add much value to robot localization over the closely located previously-identified landmark feature(s). Or, if a landmark feature candidate is too short, to declare such a too-short landmark feature candidate to be a newly identified landmark feature might be undesirable. Such a too-short landmark feature candidate may be overly affected by or sensitive to variations in the actual trajectory path taken by the mobile cleaning robot 100 across the floor surface. Thus, such a too-short landmark feature candidate may provide less confidence in any resulting wall-following re-encounter information to be used for robot localization.

In an example, the orientation of a landmark feature candidate, such as with respect to one or more previously identified landmark features, may be useful to determine whether to declare a landmark feature candidate as a newly identified landmark feature. It can be desirable to have a mix of orientations as identified landmark features. This can include a mix of orthogonal orientations, such as when an optional rectilinear assumption is being used. Or, in the absence of such as optional rectilinear assumption, a mix of non-orthogonal orientations can be desirable in a collection of identified landmark features. Similarly, it can be desirable for the collection of identified landmark features to include a mix of joined non-aligned segments, for example, such joined non-aligned segments can define a perpendicular or non-perpendicular corners, a peninsular wall formation with an associated U-turn trajectory-shape, etc.

For example, as a mobile cleaning robot 100 travels about a floor or other base surface of a household or other environment, location or pose coordinates being tracked by the controller 109 of the mobile cleaning robot 100, such as from odometry or other motion sensor data, may accumulate potential positional error. Such accumulated potential positional error—which can also be referred to as offset or drift—may be due to sensor inaccuracy or due to variations in the floor surface or in operating the drive system 110, among other things. Such accumulated potential positional error can be estimated by the controller 109. This potential positional error estimation can be based on specifications of such sensor or drive components, or variations in the floor surface or other events (e.g., including large drift events) encountered during the mission that can cause potential accumulated positional error.

For example, the controller 109 may track distance traveled by the mobile cleaning robot 100 since one or more previous re-localizations. The controller 109 may also optionally track one or more other mission conditions. Such tracked information can be compared to one or more criteria that can be used by the controller 109 to declare when re-localization should be performed based on accumulated estimated error in the location or pose coordinates. When the controller 109 deems re-localization of the mobile cleaning robot 100 to be helpful, it can optionally transition into an active identified-landmark-seeking mode. In such a mode, the controller 109 can actively direct the drive system 110 to move the mobile cleaning robot 100 toward a nearby identified landmark feature. After such travel, upon encountering such an identified landmark feature, re-localization of the mobile cleaning robot 100 can be performed by the controller 109. Such re-localization can be based on stored location information corresponding to that identified landmark feature.

Orientation of that nearby identified landmark feature can be important to localization. Consider an example in which the controller 109 directs the mobile cleaning robot 100 to an identified landmark feature that is perpendicular to the approach path of the mobile cleaning robot 100 to that identified landmark feature. For such a perpendicular approach path of re-encountering an identified landmark feature, this can help particularly with correcting a directional component of the accumulated estimated error in the direction of its approach path to the perpendicular identified landmark feature. Such a perpendicularly-oriented landmark can be less helpful for correcting an accumulated estimated error component in a direction perpendicular to such an approach path and parallel to such identified landmark feature. Similarly, such a perpendicularly-oriented landmark feature can be less helpful in correcting an accumulated θ-orientation estimated error component with respect to the approach path.

In an example, the controller 109 can be configured to detect separate directional components (x, y, θ) of the accumulated estimated error in the robot's location or pose coordinates. The controller 109 can select an identified landmark feature for re-encounter for performing robot re-localization. Such selection can be based on which accumulated estimated error component is most needing of correction. This can be determined by applying one or more criteria to one or more such tracked accumulated estimated error components (Ex, Ey, Eθ). The controller 109 can then send the mobile cleaning robot 100 on an appropriate perpendicular approach path to a particular identified landmark feature, selected by the controller 109, such as to provide correction to one or more components of the robot's localization coordinates deemed to be most needing of potential error correction. In the absence of a rectilinear assumption, the controller 109 may apply its rules such as to direct the mobile cleaning robot 100 toward an identified landmark feature that can be oriented at a 45-degree angle to a longitudinal direction of the approach path. Such a re-encounter along such a 45-degree angle approach path with such an oriented identified landmark feature can potentially provide localization correction for each of the tracked accumulated estimated error components (Ex, Ey, Eθ).

In addition or as an alternative to such "active" seeking of an identified landmark feature to perform such robot localization, in response to when the controller 109 deems the tracked accumulated estimated error to warrant such active re-localization, a passive or "reactive" re-localization can be performed. Such a reactive robot localization can be performed when, during a mission, the robot re-encounters an identified landmark feature according to a sufficiently appropriate approach path (an approach angle of which can be determined by timing of bump information by spaced-apart bump sensors) to make the re-encounter with the identified landmark feature useful to perform a re-localization of the robot. Thus, such a reactive re-localization need not require waiting for the controller 109 to determine that the tracked accumulated estimated error has reached an amount to warrant active re-localization.

In either the active or reactive re-localization, the initial location of the re-countered identified landmark feature need not, by itself, be the basis of the localization correction of the one or more components of the tracked accumulated estimated error in the robot's location or pose coordinates. For example, upon re-encountering the identified landmark feature, the controller 109 can optionally direct the mobile cleaning robot 100 to perform wall-following behavior along the wall, object, or other obstacle forming the identified landmark feature, such as until one or both endpoints of the identified landmark feature are encountered. The additional information obtained by such wall-following (e.g., orientation, distance, shape, etc.) can be used to substitute for or to augment or spatially reference the information provided by the initial location at which the mobile cleaning robot encountered the identified landmark feature.

While re-localization can be used to correct the accumulated estimated error of the robot's location coordinates, re-encounters with identified landmark features can also be used to correct the map. Also, landmark feature candidates that are declared to be newly encountered landmark features can be used to augment the map. For example, over time, information about re-encounters of the robot with an identified landmark feature can be used to adjust a position of the landmark feature within the map. For example, assuming the position of the object did not change, a spatial average or other central tendency of the trajectory path associated with the identified landmark feature can be produced, such as by merging information from several encounters with the identified landmark feature.

Similarly, identified landmark features may change. While walls are generally static, in the absence of a household remodeling or a movable wall, furniture can also present an obstacle that can be encountered and wall-followed and used to create or recognize an identified landmark feature. Such furniture can be moved. New furniture can be added. More generally, transitory objects may be placed in the environment, which may be encountered as landmark feature candidates, declared as identified landmark features, and then physically removed from the environment. Re-encountering (or failing to re-encounter) an identified landmark feature, such as during active or reactive re-localization, or during one or more other encounters with a landmark feature candidate or identified landmark feature during a mission, can be used to update the environment map, such as by the controller 109.

Error Tracking and Accumulation

For example, as a mobile cleaning robot 100 travels about a floor or other base surface of a household or other environment during a cleaning or other mission, location or pose coordinates being tracked by the controller 109 of the mobile cleaning robot 100, such as from odometry or other motion sensor data, may accumulate potential translational (x, y) or rotational (θ) error, or both. This can be due to sensor inaccuracy, variations in the floor surface, or interactions with obstacles, among other things. Such accumulated error can be referred to as "drift." That drift ($x_{drift}$, $y_{drift}$, $\theta_{drift}$) can be conceptualized as the difference between the pose the robot "thinks" it is ($x_r$, $y_r$, $\theta_r$), and its actual pose ($x_{gt}$, $y_{gt}$, $\theta_{gt}$), such as might be measured by some ground truth system, which can be expressed as follows:

$$(x_{drift}, y_{drift}, \theta_{drift}) = (x_{gt}, y_{gt}, \theta_{gt}) - (x_r, y_r, \theta_r) \quad \text{(Eq. 1)}$$

The drift accumulating during a cleaning or other mission can be tracked in a covariance matrix. The trace of the drift covariance matrix can be regarded as "uncertainty." The uncertainty can be tracked by the controller 109 using an Extended Kalman Filter (EKF). The uncertainty can be carefully managed during the mission. During a mission, when the uncertainty exceeds a threshold value (which can be an adaptive uncertainty threshold, such as explained herein), then the controller 109 can initiate carrying out one or more re-localizations, such as can provide an estimate of "ground truth" ($x_{gt}$, $y_{gt}$, $\theta_{gt}$) during the mission. The re-localization attempt can involve steering the robot to re-visit one or more adjacency-derived landmark features previously encountered during the mission. The re-localization can optionally even accommodate the use of non-unique adjacency-derived landmarks, such as straight wall segments having the same or similar length or orientation. Briefly, any straight wall segments encountered and wall-followed during a mission, can be saved as adjacency-derived landmark features for use in re-localization later in that mission or saved for use in a later mission. When the re-localization is successful, that observation can be fed into the EKF, and the uncertainty can be reduced accordingly, otherwise the uncertainty can continue to increase.

Uncertainty Threshold for Triggering Re-Localization

The "uncertainty threshold" for triggering re-localization can include multiple uncertainty thresholds, such as can be used individually or in combination with each other, such as for triggering an appropriate re-localization behavior. One or more of these thresholds need not be constant, but can be "adaptive" such as to permit the threshold to vary according to one or more factors, such as a previous threshold value, whether a re-localization event has occurred (e.g., successfully or unsuccessfully), a relationship of an event or threshold with respect to another threshold, the availability of one or more adjacency-derived landmark features, whether such landmark features have been previously encountered during the same mission, a quality or other characteristic (e.g., length, orientation, etc.) of the available landmark features, a distance from the available landmarks, a time or distance travelled by the robot since one or more previous localizations, a nature of the one or more previous localizations (e.g., localization via landmark feature vs. localization via a docking station ("dock") of the robot), or the like.

Table 1 provides an illustrative example of multiple thresholds that can be used for managing the uncertainty of the robot for operating the robot during a mission, including for re-localizing the robot to help reduce uncertainty.

TABLE 1

Illustrative Uncertainty Thresholds

| Threshold | Variability | Description |
|---|---|---|
| U1. Adaptive Threshold | Variable | U1 can vary based on uncertainty U and soft threshold U2 |
| U2. "Soft" Threshold | Fixed or Variable | U2 < U3. U2 can vary based on re-localization success or type or both |
| U3. Hard or "Maximum" Threshold | Fixed | U3 > U2 |

Relocalization Using Uncertainty and Multiple/Adaptive Thresholds

Figure 5:
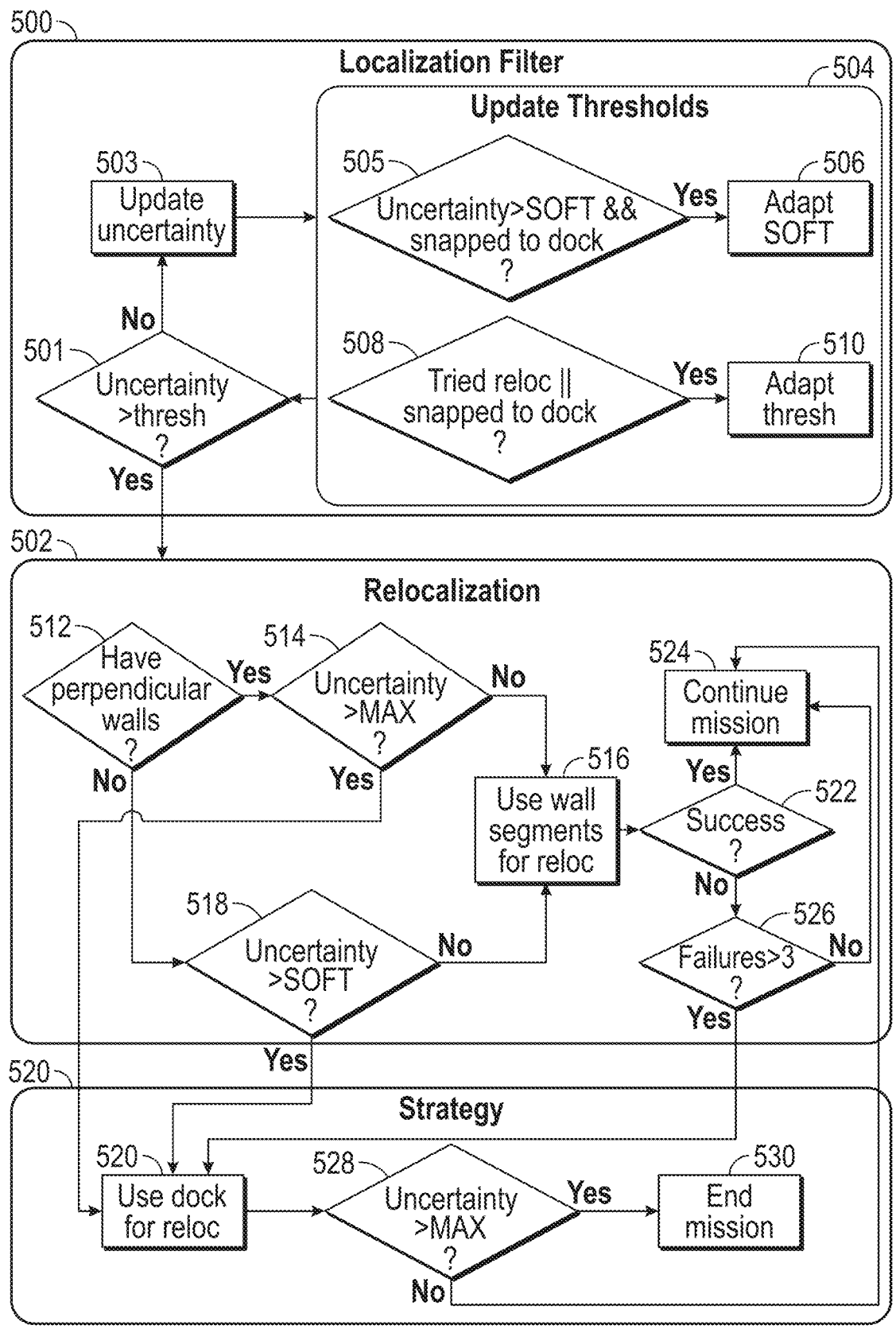
FIG. 5 is a flow/state/block diagram illustrating an example of programmed behavior for relocalization using the controllable thresholds.

FIG. 5 is a flow/state/block diagram of illustrating an example of the controller 109 performing programmed instructions for operating the robot during a mission, including an illustrative example of programmed behavior for relocalization using the controllable thresholds U1, U2, and U3 of Table 1.

At 501, during a cleaning or other mission, uncertainty (U) can be monitored, such as by a localization filter 500 the controller 109 using the EKF. This can include monitoring whether the uncertainty U exceeds the adaptive threshold (U1). At 501, if U>U1, then relocalization can be triggered at 502, otherwise the uncertainty U can be updated (increased) by the EKF at 503 and then, at 504, it can be determined whether one or more of the thresholds U1, U2, or both can be updated.

At 504, updating one or more of the thresholds U1 and U2 can include determining whether one or more conditions exist, and updating the one or more thresholds accordingly. At 505, for example, it can be determined whether the uncertainty exceeds the soft threshold (U>U2) and the preceding localization or re-localization occurred at the dock (rather than relocalizing using an adjacency-derived landmark feature, such as a straight wall segment, encountered previously during the mission) and whether the dock-based relocalization was successful. In response, then at 506, the soft threshold U2 can be adaptively adjusted. For example, if a dock-based relocalization was attempted and unsuccessful, such that the uncertainty exceeds the soft threshold (U>U2), the soft threshold U2 can be increased such as to an incremental value above the adaptive threshold U1.

At 504, updating one or more of the thresholds U1 and U2 can include determining, at 508, whether the preceding localization or re-localization successfully occurred using an adjacency-derived landmark feature (such as a straight wall segment, encountered previously during the mission) or the preceding localization or re-localization successfully occurred using the dock. If so, then at 510, the uncertainty U can be adjusted adaptive threshold U1 can be adaptively adjusted, such as based on the newly adjusted uncertainty U. At 510, this can include increasing the adaptive threshold U1, such as based on an increased uncertainty U if the relocalization failed. At 510, this adjusting the adaptive threshold U1 can include adjusting (e.g., decreasing) the adaptive threshold U1, such as based on an adjusted uncertainty U resulting from a successful relocalization.

After at 504 it is determined whether one or more conditions exist for updating one or more soft thresholds and conditionally updating such thresholds, then the mission can continue at 501, with uncertainty U being compared to the adaptive threshold U1 and, if U≤U1, updating (e.g., increasing) the uncertainty U at 503.

At 502, relocalization using adjacency-derived landmark features (such as straight wall segments) can depend on the availability or accessibility or type or quality of such a landmark feature, the amount of accumulated uncertainty U, such as relative to the one or more thresholds, or the history of previous relocalizations (e.g., relocalization type, relocalization success, amount or component of uncertainty changed by the relocalization, etc.).

At 512, for example, it can be determined whether non-aligned (e.g., perpendicular) wall segments are available or accessible as adjacency-derived landmark features for relocalization. Such availability determination can include determining whether such perpendicular straight wall segments were previously encountered and wall-followed during the mission, or stored in a map from a previous mission.

At 514, such accessibility determination can include determining that the accumulated uncertainty U does not exceed the maximum uncertainty threshold (U<U3). At 514, it can also be determined whether such perpendicular straight wall segments are close enough to the tracked location of the robot such that the travel distance estimated for sending the robot to a selected one of these straight wall segments will not cause the uncertainty U to exceed the maximum uncertainty threshold (will not cause U>U3). The selected one of the straight wall segments can be selected based on distance from the robot, or based on orientation relative to a component of uncertainty U that most needs to be reduced by re-localization. A perpendicular straight wall segment to the largest translational uncertainty component can be preferred for reducing that particular translational uncertainty component. Since the relocalization can involve wall-following the straight wall segment, an angular component of uncertainty can also be reduced along with the desired translational uncertainty component.

At 514, if the uncertainty U does not exceed the maximum uncertainty threshold (U<U3), then such perpendicular straight wall segments can be used for relocalization at 516, such as for successive wall-following of each such straight wall segment, such as to reduce both translational components of the uncertainty U.

At 512, if perpendicular wall segments are unavailable or inaccessible, then at 518 it can be determined whether the accumulated uncertainty U exceeds the soft threshold (U>U2). If not, then such a non-perpendicular wall segment can be used for relocalization at 516, such as by wall-following at least one straight wall segment, such as to reduce at least one translational component of the uncertainty U.

At 514, if the uncertainty exceeds the maximum uncertainty threshold (U>U3) or at 518, if the uncertainty exceeds the soft threshold (U>U2), then the controller 109 can command the robot to return to the dock for relocalization using the dock.

At 522, it can be determined whether the adjacency-derived landmark feature (e.g., straight wall segment) based relocalization at 516 was successful. If so, the mission can be continued or resumed at 524, and process flow can return to 501 in FIG. 5. At 522, if the adjacency-derived landmark feature (e.g., straight wall segment) based relocalization at 516 was not successful, then at a failure count since the last successful relocalization (adjacency-derived landmark feature based or dock based) can be incremented. At 526, if the failure count exceeds a specified count value (e.g., 3 successive relocalization failures), then the controller 109 can command the robot 100 to travel to the dock for dock-based relocalization at 520. Otherwise, at 526, if the failure count does not exceed the specified count value (e.g., 3 successive relocalization failures), then the mission can be continued or resumed at 524, and process flow can return to 501 in FIG. 5.

At 520, if the dock-based relocalization is successful, then the uncertainty U is reduced. In an example, the uncertainty U can be reduced more by dock-based relocalization than by adjacency-derived landmark feature (e.g., straight wall segment) based relocalization. In an example, the adjacency-derived landmark feature (e.g., straight wall segment) based relocalization can reduce the uncertainty U by a specified relative incremental amount relative to a previous uncertainty value U (or a component thereof), but the dock-based relocalization can reduce the uncertainty U to an absolute uncertainty value U, such as a baseline or minimum uncertainty value U.

At 528, after dock-based relocalization at 520, if the uncertainty exceeds the maximum uncertainty threshold value (U>U3), then the controller 109 can end the mission at 530. Otherwise, the mission can continue at 524, and process flow can return to 501 in FIG. 5.

To recap and further explain an example of operating the localization filter in tracking uncertainty U and adjusting thresholds, when the uncertainty U exceeds the adaptive threshold (U>U1) such that relocalization is triggered, the threshold U1 can be immediately decreased, e.g., relative to its previous value, such as by a specified incremental or other amount. When adjacency-derived landmark feature (e.g., straight wall segment) based relocalization is successful, then the threshold U1 can be adapted based on the new value of uncertainty U (e.g., such as by increasing the threshold U1 relative to its previous value—unless the threshold U1 exceeds the soft threshold U2 but is less than the hard threshold U3, in which case, if perpendicular wall segments are available and accessible for the next relocalization, such wall-segments are used, otherwise the next relocalization is dock-based. In an example, when relocalization based on the adjacency-derived landmark feature (e.g., straight wall segment) is unsuccessful, but the number of failures is less than the specified count (e.g., 3) and the uncertainty is less than the maximum threshold value (U≤U3), then the mission can continue and one or more additional attempts at relocalization using the adjacency-derived landmark feature (e.g., straight wall segment) can be carried out.

To recap and further explain when relocalization is dock-based instead of wall-segment based, the dock-based relocalization can be triggered in at least two situations. First, when (1) uncertainty exceeds the adaptive threshold (U>U1) AND (2) perpendicular wall segments are unavailable or inaccessible AND (3) uncertainty exceeds the soft threshold (U>U2), then dock-based relocalization can be triggered. Second, when (1) uncertainty exceeds the adaptive threshold and the soft threshold and the maximum threshold (U>(U1 and U2 and U3)) then dock-based relocalization can be triggered—regardless whether perpendicular wall segments are available or are accessible.

Operational Example Graph for a Use-Case

Figure 6:
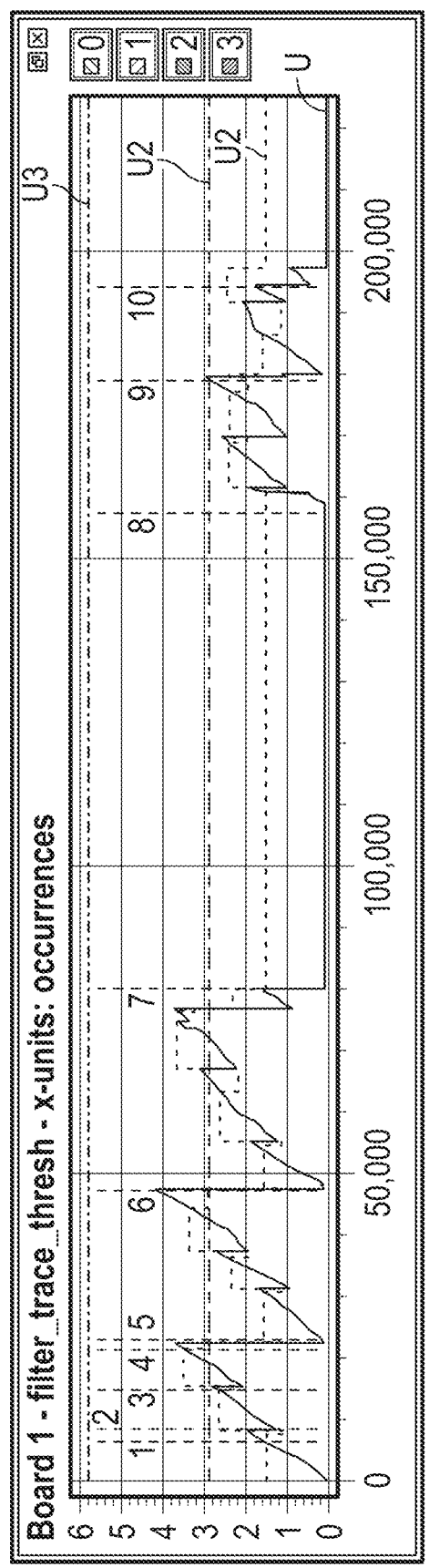
FIG. 6 is a graph vs. time of uncertainty (U) and thresholds for a use-case of an example applying the technique described above, such as with respect to FIG. 5.

FIG. 6 is a graph vs. time of uncertainty (U) and thresholds (adaptive threshold U1, soft threshold U2, maximum threshold U3) for an illustrative, non-limiting use-case of an example applying the technique described above, such as with respect to FIG. 5.

At time t=0, such as at the beginning of the mission with the robot departing the dock, the uncertainty is U=0<U1<U2<U3. As the robot moves about the environment, the uncertainty U increases until time 1.

At time 1, the increasing uncertainty U becomes such that U>U1, triggering relocalization behavior and an immediate relative decrease in U1, such as by a specified amount relative to its previous value. The robot is considered lost and its uncertainty U continues to increase.

At time 2, a successful straight wall segment based relocalization occurs, in which wall-following of at least one straight wall segment is performed during such relocalization. This triggers a reduction in uncertainty U by an amount relative to its previous value, and triggers an adjustment in U1 based on the reduced uncertainty U (e.g., such as in this case by a specified amount relative to its previous value. The amount by which uncertainty U is reduced may depend on a characteristic of the straight wall segment (e.g., length, orientation, perpendicular segment availability). The amount by which the threshold U1 is adjusted, may depend on the adjustment to U and a characteristic of a relocalization history (e.g., type, success, number of failures, etc.). For example, increasing the threshold U1 can give the robot more time to clean before the next relocalization, however, when the threshold U1 has increased beyond the soft threshold U2, another relocalization, such as another type of relocalization, such as a dock-based relocalization, may be triggered, e.g., depending on whether perpendicular wall segments are then available for a non-dock relocalization. In the example of FIG. 6, at time 2, however, U1<U2, so the robot continues its mission after the successful straight-wall-based relocalization and uncertainty U increases accordingly.

At time 3, the accumulated uncertainty has increased such that U>U1, triggering a relative reduction in U1 and another adjacency-derived landmark feature (e.g., wall-following a straight wall segment) based relocalization, which occurs successfully and relocalizes just after time 3, thereby causing a relative decrease in the uncertainty U from its previous value and an adjustment in the adaptive threshold U1 such as based on the newly decreased uncertainty U (e.g., in this case causing a relative increase in the adaptive threshold U1—this time to an adaptive threshold value that exceeds the soft threshold value (U1>U2). Because U1>U2 and, in this example, only parallel (not perpendicular) wall segments are available for wall-based relocalization, the next triggered relocalization can be commanded to be of a different type, e.g., dock-based rather than wall-based. After the wall-based relocalization at time 3, the mission continues, and uncertainty U increases accordingly.

At time 4, the accumulated uncertainty U has increased such that U>U1, triggering an immediate relative reduction in the adaptive threshold U1 and relocalization. Since U1>U2, and only parallel (not perpendicular) wall segments are available for wall-based relocalization, a different type of relocalization, e.g., dock-based relocalization, is triggered. Uncertainty U continues to increase until such dock-based relocalization is performed.

At time 5, the dock-based relocalization signal is successfully performed, thereby reducing uncertainty U to a baseline or minimum value, and adjusting the adaptive threshold U1 based on the new uncertainty U—e.g., to an absolute threshold value U1, such as the same value U1 that was initialized at time t=0.

Between time 5 and time 6, the mission continued with two straight-wall segment relocalization events, with behavior similar to that previously described. At time 6, in this example, only parallel and not perpendicular wall segments were available for re-localization, so a different type of relocalization, e.g., dock-based relocalization, was triggered, with a resulting state similar to that described with respect to time 5.

Between time 6 and time 7, the mission continued with three straight-wall segment relocalization events, with the third one of these relocalization events being performed with U1>U2 because perpendicular wall segments were then available for use in wall-segment-based relocalization, such that a different type of relocalization such as dock-based relocalization was not commanded.

At time 7, the controller 109 directed the robot 100 to the dock because it needed re-charging, rather than re-localization, however, during or after such re-charging at the dock, dock-based re-localization was performed, thereby reducing uncertainty U and adjusting the adaptive threshold U1 based on the reduced uncertain U.

At time 8, after re-charging, the robot resumed its mission with its uncertainty U reduced to a minimum and the adaptive threshold U1 initialized to the same absolute value as that of t=0.

Between time 8 and time 9, three wall-based relocalization events occurred, with the last wall-based relocalization event at time 9 involving two nearby perpendicular walls, thereby reducing the uncertainty U considerably at time 9, but not reducing uncertainty U to its dock-based minimum value.

Between time 9 and time 10, a single wall-based relocalization event occurred, as a result of the uncertainty U exceeding the adaptive threshold U1, triggering an immediate relative reduction in the adaptive threshold U1, and wall-based relocalization event.

At time 10, the robot re-observed a wall during normal cleaning mission operation—not during a wall-based relocalization event, however, re-encountering such an adjacency-derived landmark feature (e.g., a straight wall segment) also triggers a relative uncertainty reduction—even though the accumulated uncertainty U had not yet grown to exceed the adaptive threshold U1.

Relocalization Based on Landmark Characteristic and Path Planning

Figure 7:
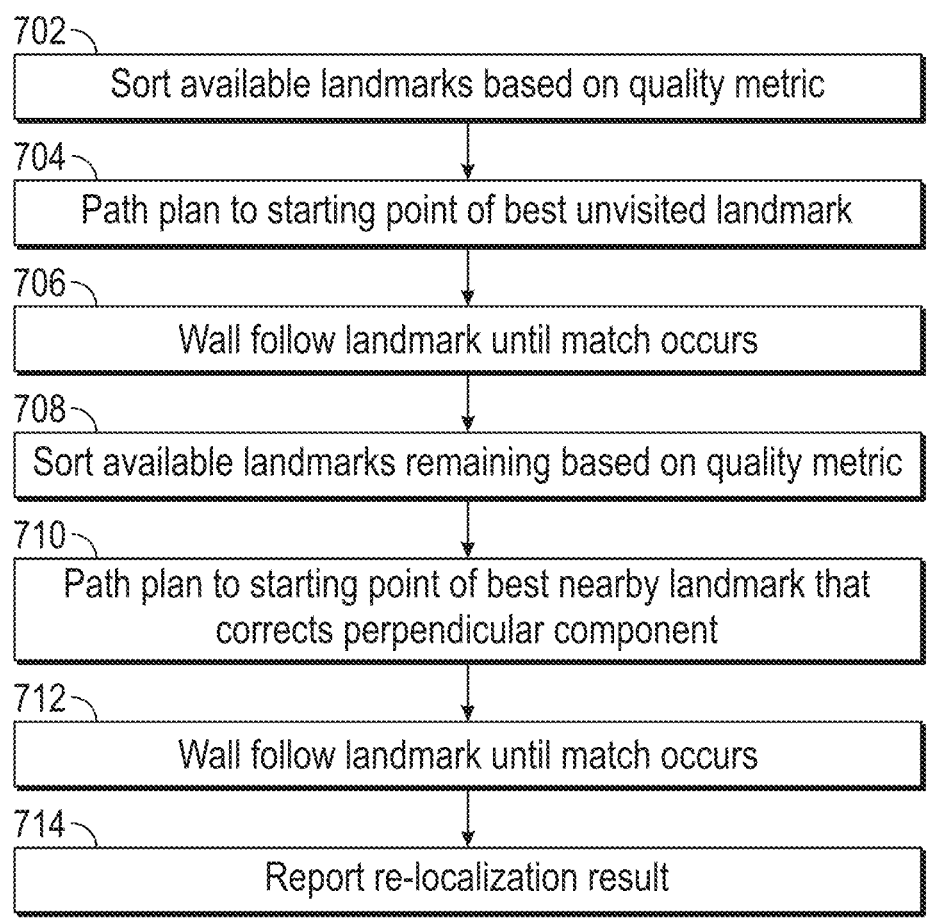
FIG. 7 is a flow chart providing an overview of an example of operations that can be carried out during a relocalization, with more detail provided in FIG. 8.
Figure 8:
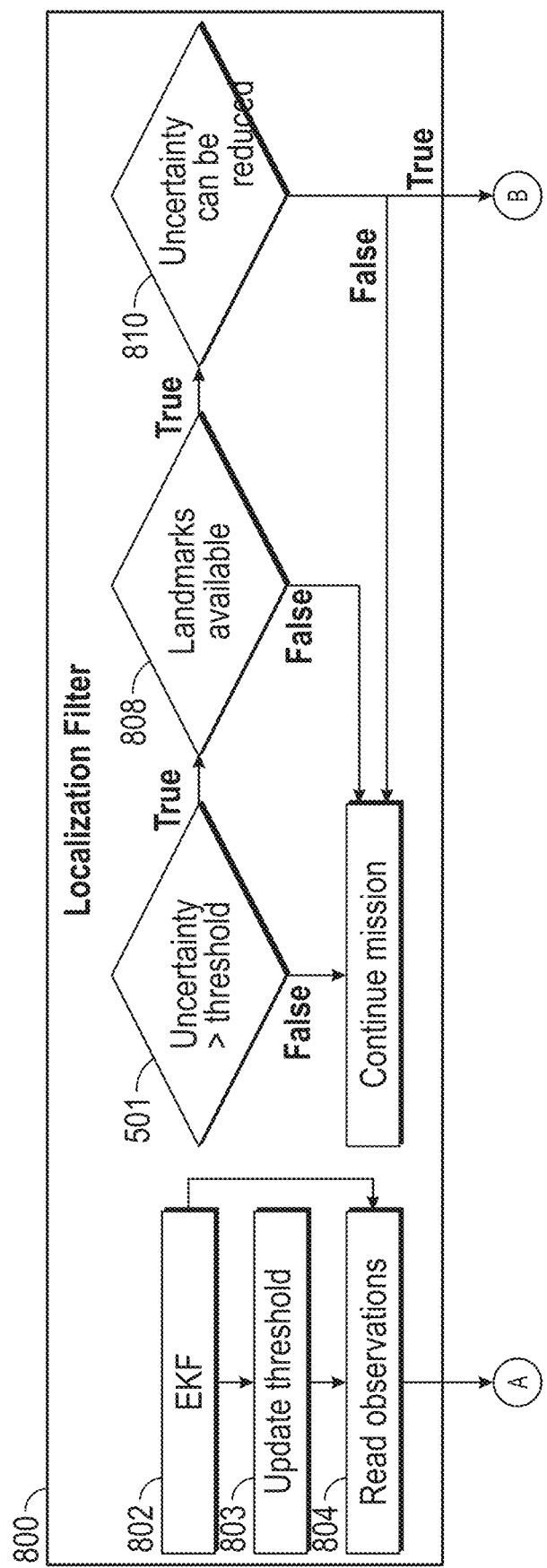
FIG. 8 is a flow/state/block diagram example that adds additional operations or details to what was shown in FIG. 5, including how features can be sorted, evaluated, path-planned and navigated to for wall-following, and used for relocalization to reduce uncertainty.
Figure 8:
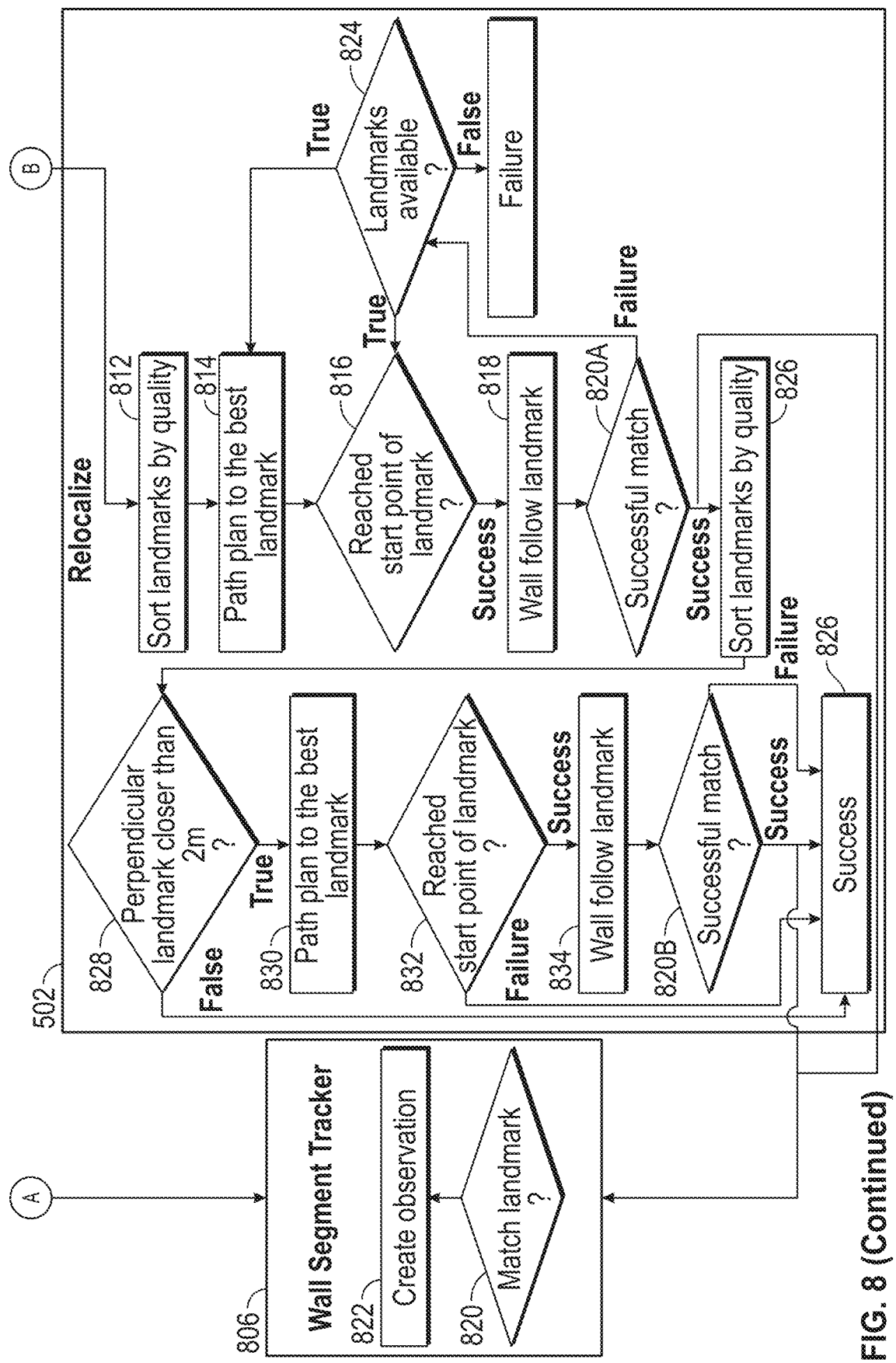

FIG. 7 is a flow chart providing an overview of an example of operations that can be carried out during a relocalization, with more detail provided in FIG. 8.

At 702, available adjacency-derived landmark features (e.g., straight wall segments) can be sorted, such as based on a first quality metric.

At 704, a path can be planned from the then-estimated robot location to an estimated starting location of the best unvisited landmark feature.

At 706, the landmark feature can be wall-followed, until a match is confirmed.

At 708, other available adjacency-derived landmark features can be sorted, such as based upon a second quality metric.

At 710, a path can be planned from the then-estimated robot location to an estimated starting location of the best nearby (e.g., less than a threshold distance such as 2 meters) landmark feature that is oriented perpendicularly to the landmark feature that was wall-followed at 706.

At 712, the landmark feature selected at 710 can be wall-followed, until a match is confirmed.

At 714, the resulting relocalization information can be reported back to the EKF of the localization filter, and used to update the uncertainty U being tracked by the EKF.

FIG. 8 is a flow/state/block diagram example that adds additional operations or details to what was shown in FIG. 5, including how adjacency-derived landmark features (such as straight wall segments) can be sorted, evaluated, path-planned and navigated to for wall-following, and used for relocalization to reduce uncertainty.

In FIG. 8, the localization filter 800 can include the EKF 802 for tracking the uncertainty U, which increases during the mission until decreased by an adjacency-derived landmark feature based relocalization or a dock-based relocalization. At 804, one or more thresholds, such as the adaptive threshold U1 can be updated, such as explained above with respect to FIG. 5, such as with respect to 504. The uncertainty can be compared to one or more thresholds, such as described above with respect to FIG. 5 and, when appropriate, an adjacency-derived landmark feature relocalization or a dock-based relocalization can be carried out.

At 803, for an adjacency-derived landmark feature relocalization, one or more observations of the EKF 802 can be read from a wall-segment tracker 806, which can provide the localization information as an input for updating the uncertainty U tracked by the EKF 802, for updating one or more thresholds at 804.

At 501, if the uncertainty exceeds the adaptive threshold (U>U1) and, at 808, one or more adjacency-derived landmark features (e.g., straight wall segments) is available and accessible to be navigated to for a relocalization using the one or more adjacency-derived landmark features, and 810, the uncertainty U is predicted to be capable of being reduced by a relocalization using the one or more adjacency-derived landmark features (e.g., the available landmarks include one or more landmarks that have the appropriate orientation or other characteristic), then relocalization 502 can be triggered.

At 502 in FIG. 8, the relocalization can include, at 812, sorting available landmarks according to a first quality metric (such as described further herein). At 814, a path to the best landmark (e.g., based on the sorting) can be planned (such as described further herein), and the robot can be navigated to an estimated starting point associated with that landmark. At 816, upon successfully reaching the desired starting point associated with that landmark, at 818, the landmark can be wall-followed, such as using the wall-segment tracker 806, until a match can be declared at 820A. A resulting localization observation can be reported at 822 by the wall segment tracker 806, such as to be read at 803 by the localization filter 800, such as for use in reducing the uncertainty U.

At 816, if the robot does not successfully reach the desired starting point of the desired landmark, or at 820, if the wall following does not result in a successful match, then at 824, it can be determined whether one or more other landmarks are available, such as using the sorted list produced at 812. If so, another landmark can be picked from the list and, at 814, path planning to such alternative landmark can begin.

At 820A, after a successful wall-following match of a first landmark and observation reporting at 822 based on the same, the remaining landmarks (other than the first landmark) can be sorted at 826, such as based on a second quality metric. The sorting at 826 of the remaining landmarks according to the second quality metric may differ from the from the sorting at 812 based on the first quality metric. For example, it may be desirable to sort according to a preference for remaining landmarks that are perpendicular to the first landmark and close to the robot's position upon completing the wall-following of the first landmark.

At 828, if the remaining landmarks include a perpendicular landmark within a specified distance (e.g., 2 meters) of the robot's position upon completing the wall-following of the first landmark, then at 830 path planning to a best such perpendicular landmark within the specified distance can be carried out.

At 832, upon successfully reaching the starting point of the perpendicular second landmark, wall-following can be carried out at 834. If the wall-following results in a successful match at 820, then additional localization observation information based on the perpendicular landmark can be reported at 822 by the wall segment tracker 808 and read by the localization filter 800 at 803 as an observation and used for further reducing the uncertainty U.

At 828, if there is no perpendicular landmark within the specified distance, or if at 832, the path-planned starting location of the perpendicular landmark is not successfully reached or if, at 820B, there is no successful match to the perpendicular landmark, then the localization observation can be carried out based upon the observation information generated by the successful match at 820A to the first landmark, without being augmented by any observation information from any perpendicular landmark, in an example.

The sorting at 812 and 826 can be carried out according to the same or a different quality metric. The quality metric can consider and weight adjacency-derived landmark features such as wall-segments according to one or more input factors. For example, a first (heavily) weighted factor can include calculating an estimated uncertainty correction that would result from a successful wall-following relocalization using the wall segment landmark feature. This estimated uncertainty correction can be produced by simulating the EKF observation and producing a corresponding new covariance matrix. A second weighted factor can include a path distance with respect to the current pose P of the robot. A third weighted factor can include a length of the straight wall segment landmark feature. A fourth weighted factor can include an indication of whether or how often or how frequently that straight wall segment landmark feature has previously failed in one or more ways, e.g., unsuccessful at reaching the starting point of that landmark feature, unsuccessful at wall-following that landmark feature, unsuccessful at matching that landmark feature, or the like.

Weighting the first factor most heavily can help ensure that the uncertainty component most needing correction is addressed first, such as for selecting the first landmark, before then seeking a nearby perpendicular second landmark for correcting a perpendicular component of the uncertainty.

Path Planning and Wall Engagement

FIG. 8 included operations involving path planning to a selected adjacency-derived landmark feature, such as a straight wall segment. In particular, it can be desirable to path plan to a starting point for wall-following the straight wall segment landmark. Thus, path planning can involve directing the robot to a particular starting location that allows the robot to engage the straight wall segment landmark and to wall-follow along its entire length while going the same direction. This can permit substantially maximizing wall-following length during a wall-following that can be restricted to a designated lateral side of the robot.

Because of the uncertainty in the robot pose P before navigating to the straight wall segment landmark feature, it may be desirable to path plan to multiple candidate starting point locations associated with a specified end of that straight wall segment landmark feature.

Figure 9:
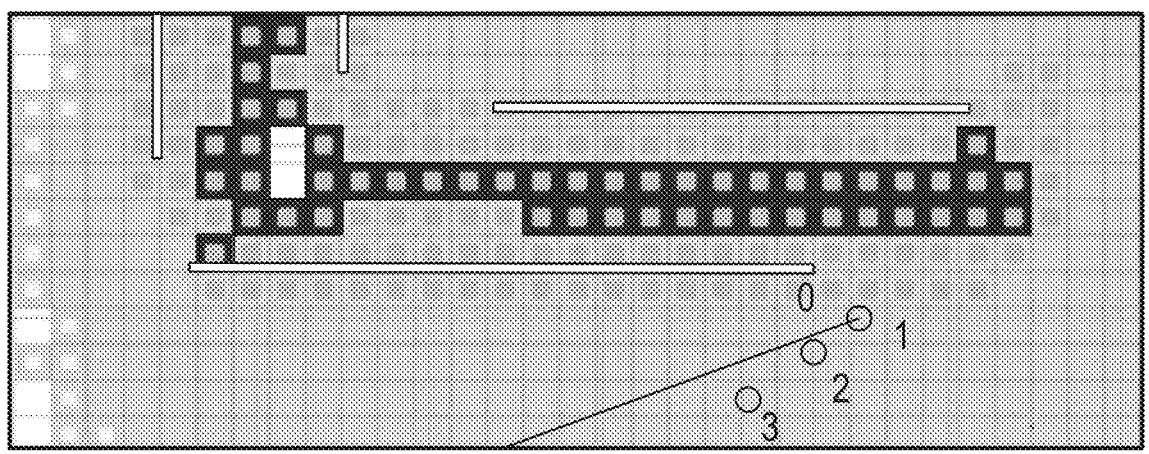
FIG. 9 illustrates an example of path planning for navigating the robot to a desired starting point 0 at the "east" end of an "east-west" straight wall segment landmark feature.

FIG. 9 illustrates an example of path planning for navigating the robot to a desired starting point 0 at the "east" end of an "east-west" straight wall segment landmark feature. Because of accumulated uncertainty in the robot's current pose, and to help avoid recording and storing a robot pose along with the straight wall segment landmark feature when such landmark feature was initially encountered and created, it can be desirable to path plan from an estimated current robot pose P to multiple candidate poses (1, 2, 3) near the desired starting point 0, such as with different positional error tolerances. In directing the robot toward an end of the straight wall segment landmark, it may be more difficult to engage the straight wall segment landmark—without missing the straight wall segment. This can be mitigated by an appropriate wall-engaging behavior.

Figure 10:
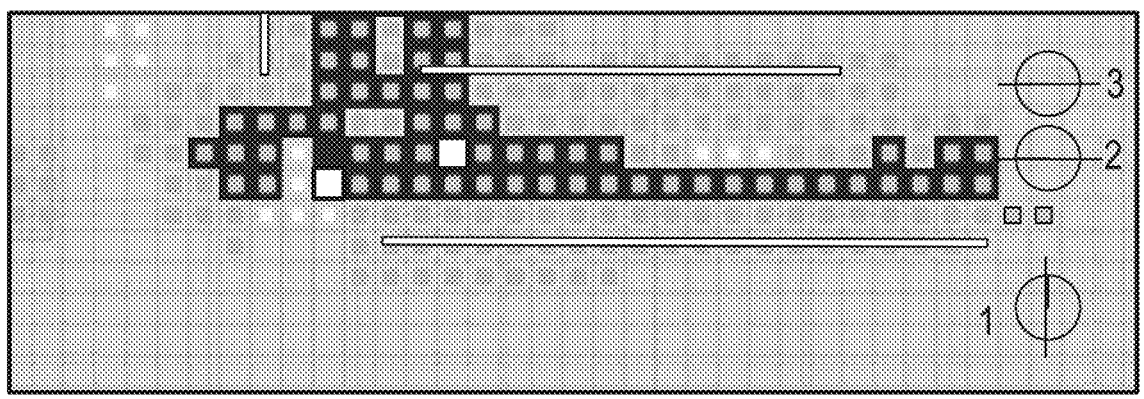
FIG. 10 illustrates an example of wall-engaging behavior that can help improve the likelihood that a straight wall segment landmark feature can be engaged and wall-followed along its entire length, or substantially along its entire length.

FIG. 10 illustrates an example of wall-engaging behavior that can help improve the likelihood that a straight wall segment landmark feature can be engaged and wall-followed along its entire length, or substantially along its entire length. In FIG. 10, the controller 109 has commanded the robot 100 to follow a path-planned route, along which it has been navigated to Pose 1. Upon reaching Pose 1, the controller 109 can command the robot 100 to pivot to point in a direction toward where it thinks the desired starting point 0 of the straight wall segment landmark feature is located. After pivoting, the controller 109 commands the robot to move forward until it either bumps into the wall, or it has travelled a specified distance limit (e.g., 1.5 meters). If it bumps into the wall, then it pivots in a designated direction (e.g., counterclockwise) and performs a wall-following of the straight wall segment landmark feature that can be restricted to a designated lateral side (e.g., the right side) of the robot. If no bump occurs within the specified distance limit, then the robot pivots in a designated direction (e.g., counterclockwise) and again moves forward (see, e.g., Pose 2 in FIG. 10) until either a bump occurs or a specified distance limit (e.g., 1.5 meters) is travelled. If a bump occurs, then the robot pivots in a designated direction (e.g., counterclockwise) and performs a wall following that can be restricted to the designated lateral side (e.g., the right side of the robot), turns the corner (90 degrees clockwise) at the desired starting location 0, and begins wall-following the desired straight walls segment landmark feature from "east" to "west" in FIG. 10. If no bump occurs within the second specified distance (see, e.g., Pose 3 in FIG. 10), then the robot path-plans or otherwise seeks another adjacency-derived landmark feature, such as a straight wall segment.

In this manner, in seeking to engage a straight wall segment landmark feature, the robot can always be commanded to pivot in the same direction (e.g., counterclockwise) until it bumps into a wall. Upon bumping into a wall, it can be commanded to perform wall-following that can be restricted to a designated lateral side (e.g., right side) of the robot. Such wall-following behavior may involve clockwise pivots, such as a 90 degree or other turn around a corner joining two contiguous wall segments.

Commanding path planning, such as described with respect to FIG. 9, commanding wall-engagement, such as described with respect to FIG. 10, can promote wall-following along a maximum or entire length of a straight wall segment landmark feature. This can help enable localization using a set of landmark features that can allow non-unique landmark features in the set, such as two straight wall segments having the same length, same orientation, or both of the same length and orientation. It can also do so without requiring storing, together with the straight wall segment landmark feature information, a robot pose associated with the wall-engagement, which can help provide more robust localization behavior.

While this document has emphasized the use of adjacency sensor and motion sensor data to avoid the expense and complexity of using a camera, LIDAR, or other "at-a-distance" sensor data, and has explained how to overcome the additional technical challenges presented when relying on adjacency sensor and motion sensor data without using such "at-a-distance" sensor data, it is understood that the present techniques could also be applied in a use-case that does include a camera or other "at-a-distance" sensor, such as to augment the particle filter and other robot localization and mapping techniques of such an approach that can include such an "at-a-distance" sensor. While certain figures and description in this document include such a possibility of including a camera or imaging sensor or other "at a distance" or distance-ranging sensor, such "at a distance" or distance-ranging sensors are not required. Instead, the present techniques can enable the use of a more limited selection of adjacency sensors providing adjacency sensor data instead of a camera, imaging sensor, or other "at a distance" or distance-ranging sensor, thereby avoiding complexity and expense of including such sensors and associated signal processing.

While this document makes reference to the mobile cleaning robot 100 that performs floor cleaning, the robot scheduling and controlling system and methods discussed herein can be used in robots designed for different applications, such as mopping, mowing, transporting, surveillance, among others. Additionally, while some components, modules, and operations may be described as being implemented in and performed by the mobile cleaning robot 100, by a user, by a computing device, or by another actor, these operations may, in some implementations, be performed by actors other than those described. For example, an operation performed by the mobile cleaning robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the mobile cleaning robot 100. In some implementations, the mobile cleaning robot 100 can perform, in addition to the operations described as being performed by the mobile cleaning robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations may be omitted, or additional operations or sub-operations may be added.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A mobile cleaning robot, comprising:
   a drive system configured to move the robot about a surface of an environment;
   a motion sensor configured to monitor movement of the robot; and
   a controller circuit, configured to:
      track uncertainty in a pose of the robot;
      select a localization strategy between a non-dock localization and a dock-based localization based at least in part on a comparison of the tracked uncertainty to one or more threshold values or value ranges including an adaptive first threshold and a second threshold, the selection including selecting the dock-based localization when (i) the adaptive first threshold exceeds the second threshold and (ii) differently oriented non-dock adjacency-derived landmark features are inaccessible for relocalization; and
      trigger localization of the robot in the environment using the selected localization strategy.

2. The mobile cleaning robot of claim 1,
   wherein the controller is configured to:
   trigger the non-dock localization using adjacency-derived landmark features when the tracked uncertainty exceeds the adaptive first threshold and is less than the second threshold; and
   trigger the non-dock localization using the non-dock adjacency-derived landmark features when (i) the first threshold exceeds the second threshold and (ii) the differently oriented non-dock adjacency-derived landmark features are accessible for the non-dock localization.

3. The mobile cleaning robot of claim 2, wherein the controller is configured to, when the non-dock localization is successful, adjust the uncertainty and to adjust the first threshold based on the adjusted uncertainty.

4. The mobile cleaning robot of claim 1, wherein the controller is configured to, when the dock-based localization is successful, adjust the uncertainty and to adjust the first threshold based on the adjusted uncertainty.

5. The mobile cleaning robot of claim 1, wherein the one or more threshold values or value ranges includes a third threshold greater than the second threshold,
   wherein the controller is configured to trigger the dock-based localization when the uncertainty exceeds the third threshold regardless of whether the differently oriented non-dock adjacency-derived landmark features are inaccessible for relocalization.

6. The mobile cleaning robot of claim 1, wherein the controller is configured to, in response to the tracked uncertainty exceeding the first threshold, determine an accessibility of the differently oriented non-dock adjacency-derived landmark features based at least in part on a then-current robot pose.

7. The mobile cleaning robot of claim 1, wherein the differently oriented non-dock adjacency-derived landmark features include perpendicular straight wall segments.

8. The mobile cleaning robot of claim 1, wherein the differently oriented non-dock adjacency-derived landmark features permits non-unique adjacency-derived landmark features that permit at least two different landmark features to have the same length and orientation.

9. The mobile cleaning robot of claim 1, wherein the controller is configured to trigger the dock-based localization based on a record of past unsuccessful non-dock localizations.

10. The mobile cleaning robot of claim 1, wherein the controller is configured to plan a path for navigating the robot to an estimated starting location for engaging a non-dock adjacency-derived straight wall segment landmark and substantially maximizing wall-following length during a wall-following that is restricted to a designated lateral side of the robot.

11. The mobile cleaning robot of claim 1, further comprising a non-imaging and non-distance-ranging adjacency sensor configured to receive adjacency sensor data indicating an obstacle in the environment being adjacent to or in contact with the mobile cleaning robot for use as an adjacency-derived landmark feature in a set of landmark features that allows inclusion of non-unique landmark features including differently oriented straight wall segments,
wherein the controller circuit is configured to trigger localization of the robot further using a landmark feature in the set of landmark features that allows inclusion of the non-unique landmark features.

12. A method of operating a mobile cleaning robot, the method comprising:
moving the robot about a surface of an environment via a drive system of the robot;
monitoring movement of the robot via a sensor data;
tracking uncertainty in at least one of a location or pose of the robot;
selecting a localization strategy between a non-dock localization and a dock-based localization based at least in part on a comparison of the tracked uncertainty to one or more threshold values or value ranges including an adaptive first threshold and a second threshold, wherein selecting the localization strategy includes selecting the dock-based localization when (i) the adaptive first threshold exceeds the second threshold and (ii) differently oriented non-dock adjacency-derived landmark features are inaccessible for relocalization; and
triggering localization of the robot using the selected localization strategy.

13. The method of claim 12, wherein triggering the localization of the robot includes:
triggering the non-dock localization using adjacency-derived landmark features when the tracked uncertainty exceeds the adaptive first threshold and is less than the second threshold; and
triggering the non-dock localization using the non-dock adjacency-derived landmark features when (i) the first threshold exceeds the second threshold and (ii) the differently oriented non-dock adjacency-derived landmark features are accessible for the non-dock localization.

14. The method of claim 12, wherein the one or more threshold values or value ranges includes a third threshold greater than the second threshold,
wherein triggering the localization of the robot includes triggering the dock-based localization when the uncertainty exceeds the third threshold regardless of whether the differently oriented non-dock adjacency-derived landmark features are inaccessible for relocalization.

15. The method of claim 12, further comprising determining an accessibility of the differently oriented non-dock adjacency-derived landmark features based at least in part on a then-current robot pose.

16. The method of claim 12, comprising receiving adjacency sensor data indicating an obstacle in the environment being adjacent to or in contact with the mobile cleaning robot for use as an adjacency-derived landmark feature in a set of landmark features that allows inclusion of non-unique landmark features including differently oriented straight wall segments,
wherein triggering localization of the robot incudes using a landmark feature in the set of landmark features.

17. The method of claim 12, further comprising: when at least one of the dock-based localization or the non-dock localization is successful, adjusting the uncertainty, and adjusting the first threshold based on the adjusted uncertainty.

18. The method of claim 12, wherein the differently oriented non-dock adjacency-derived landmark features include perpendicular straight wall segments.

19. The method of claim 12, wherein triggering the dock-based localization is further based on a record of past unsuccessful non-dock localizations.

20. The method of claim 12, further comprising: planning a path for navigating the robot to an estimated starting location for engaging a non-dock adjacency-derived straight wall segment landmark and substantially maximizing wall-following length during a wall-following that is restricted to a designated lateral side of the robot.

* * * * *

UNITED STATES PATENT AND TRADEMARK OFFICE
CERTIFICATE OF CORRECTION

PATENT NO. : 12,429,888 B2
APPLICATION NO. : 18/202413
DATED : September 30, 2025
INVENTOR(S) : Karapetyan et al.

Page 1 of 1

It is certified that error appears in the above-identified patent and that said Letters Patent is hereby corrected as shown below:

In the Claims

In Column 36, Line 29, in Claim 16, delete "incudes" and insert --includes-- therefor Signed and Sealed this
Twenty-third Day of December, 2025

John A. Squires
*Director of the United States Patent and Trademark Office*